(12) United States Patent
Krieger et al.

(10) Patent No.: US 10,975,840 B2
(45) Date of Patent: Apr. 13, 2021

(54) WIND POWER PLANT

(71) Applicants: Klaus Krieger, Bruehl (DE); Martin Van Egeren, Bruehl (DE)

(72) Inventors: Klaus Krieger, Bruehl (DE); Martin Van Egeren, Bruehl (DE)

( * ) Notice: Subject to any disclaimer, the term of this patent is extended or adjusted under 35 U.S.C. 154(b) by 143 days.

(21) Appl. No.: 16/466,091

(22) PCT Filed: Nov. 30, 2017

(86) PCT No.: PCT/EP2017/001394
§ 371 (c)(1),
(2) Date: Jun. 3, 2019

(87) PCT Pub. No.: WO2018/099598
PCT Pub. Date: Jun. 7, 2018

(65) Prior Publication Data
US 2020/0072191 A1 Mar. 5, 2020

(30) Foreign Application Priority Data

Dec. 2, 2016 (DE) .......................... 102016014339.8
Dec. 2, 2016 (DE) .......................... 202016007375.4

(51) Int. Cl.
*F03D 7/02* (2006.01)
*F03D 7/04* (2006.01)

(52) U.S. Cl.
CPC .......... *F03D 7/0224* (2013.01); *F03D 7/041* (2013.01); *F05B 2260/74* (2013.01); *F05B 2260/77* (2013.01)

(58) Field of Classification Search
CPC .......... F03D 7/0224; F03D 7/041; F01D 7/02; B64D 41/007
See application file for complete search history.

(56) References Cited

U.S. PATENT DOCUMENTS

| 2,080,955 A | 5/1937 | Watkins |
| 2,284,521 A | 5/1942 | Insua |
| 2,997,109 A * | 8/1961 | Blackburn ................ F01D 7/02 416/137 |

(Continued)

FOREIGN PATENT DOCUMENTS

| CH | 225848 A | 2/1943 |
| DE | 3319165 A1 | 12/1984 |

(Continued)

*Primary Examiner* — Justin D Seabe
(74) *Attorney, Agent, or Firm* — Laurence A. Greenberg; Werner H. Sterner; Ralph E. Locher

(57) ABSTRACT

A wind power plant has at least one rotor. The rotor has at least two rotor blades and each rotor blade is rotatable about a substantially radially aligned adjustment axis. At least one angle adjustment device is provided for adjustment of the rotor blades. The angle adjustment device has a control disk and at least two cam disks interacting with the control disk. Each cam disk is rotatably mounted about a rotation axis. The rotation axis of the respective cam disk coincides, and is in particular superimposed, together with the respective adjustment axis of the respective rotor blade. The noise development, the maintenance expense, and/or costs of a wind power plant are reduced in that the cam disks are functionally effectively permanently coupled via at least one coupling element.

22 Claims, 21 Drawing Sheets

(56) References Cited

U.S. PATENT DOCUMENTS

| | | | | |
|---|---|---|---|---|
| 4,201,514 A * | 5/1980 | Huetter | ............... | F03D 7/041 416/37 |
| 7,137,785 B2 * | 11/2006 | Van Egeren | ......... | F03D 7/0224 416/147 |
| 2013/0216378 A1 * | 8/2013 | Himmelmann | ......... | F03D 7/041 416/1 |

FOREIGN PATENT DOCUMENTS

| | | |
|---|---|---|
| DE | 221505 A1 | 4/1985 |
| DE | 19941630 C1 | 3/2001 |
| DE | 10226713 A1 | 1/2004 |
| DE | 202009012104 U1 | 11/2009 |
| DE | 102010019769 A1 | 11/2011 |
| DE | 102012013365 A1 | 12/2013 |
| EP | 1126163 A1 | 8/2001 |

\* cited by examiner

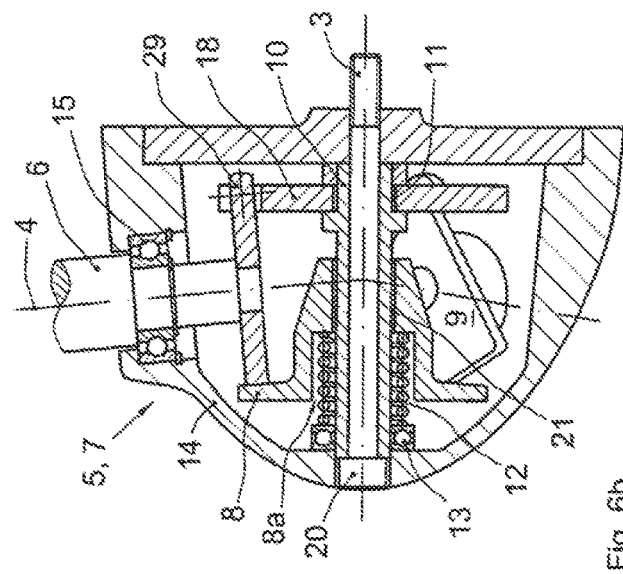
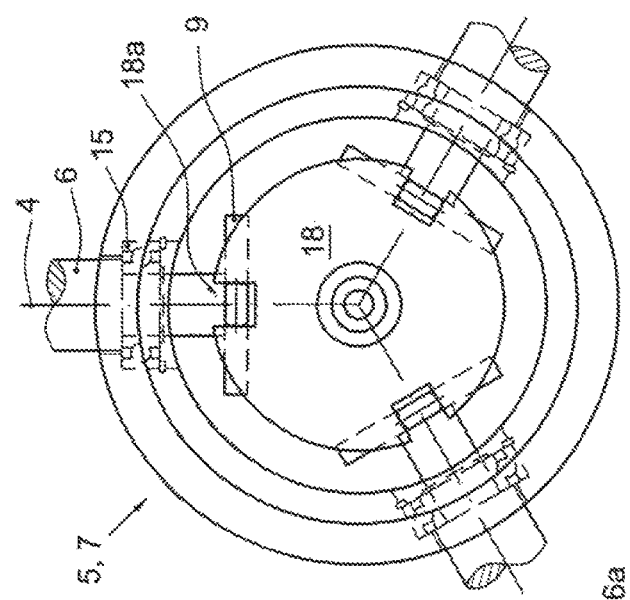
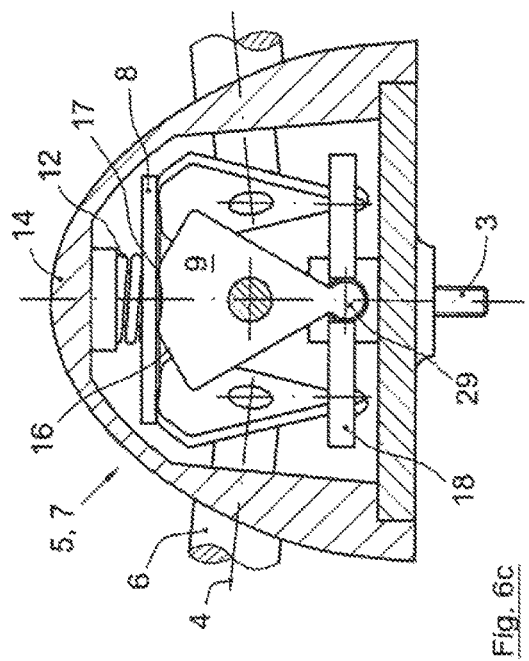

WIND POWER PLANT

BACKGROUND OF THE INVENTION

Field of the Invention

The invention relates to a wind power installation having at least one rotor, wherein the rotor has at least two rotor blades, wherein each rotor blade is rotatable about a substantially radially aligned adjustment axis, wherein at least one angle adjustment device is provided for adjustment of the rotor blades, wherein the angle adjustment device has at least one control disk and at least two disk cams acting in combination with the control disk, wherein each disk cam is mounted so as to be rotatable about a rotation axis, and wherein the rotation axis of the respective disk cam coincides with the respective adjustment axis of the respective rotor blade, in particular is superimposed.

Known from the prior art, from which the invention proceeds, is a wind power installation (DE 102 26 713 A1) in which the rotor has a plurality of rotor blades, and wherein the respective rotor blade is operatively connected, via a stub shaft that is rotatably mounted in the rotor hub, or via this rotor-blade mounting, to a rotor shaft realized on the hub. Since the respective rotor blade is rotatably mounted, it is rotatable, with respect to the axis of the rotor-blade shaft, about its or this substantially radially aligned adjustment axis. For the purpose of setting, i.e. for the respective positioning, or respective angular alignment of the respective rotor blade, an angle adjustment device is provided, which acts upon the respective adjustment axis of the rotor blades. The angle adjustment device realized here is realized substantially as a "disk cam mechanism". For this purpose, the angle adjustment device has a control disk and a plurality of disk cams that act in combination with the control disk. In this case, force is applied to the control disk, in the direction of the disk cams, by a spring element. The angle adjustment device, realized thus as a disk cam mechanism, is used to control a defined rotation/alignment of the respective rotor blade, about its respective adjustment axis.

Additionally known in the prior art is a wind power installation (DD 221 505 A1) in which the rotor blades can be correspondingly adjusted, or rotated, via an angle adjustment device realized as a rod mechanism. Here, constrained guidance of the respective rotor blade is effected by means of a control cam, the guide ring being arranged on the stump shaft of the respective rotor blade. The individual rotor blades are operatively connected to a setting wheel arranged on the rotor shaft, an adjustment being effected by use of thrust cranks provided between the stump shafts of the rotor blades and the setting wheel.

Additionally described, in DE 20 2009 012 104 U1, is a wind power installation that has a type of rod mechanism as an angle adjustment device for the rotor blades of a wind power installation, the defined radial adjustment of a respective rotor blade being transformed, by means of an articulated lever, into an axial displacement of a actuating element. The axial displacement of the actuating element is also delayed, by means of a damper, with respect to abrupt loads (resulting from wind gusts), or the control mechanism is protected. Ultimately, here also, an angle adjustment device is created for controlling the positions/alignments of the rotor blades by closed-loop/open-loop control.

However, the wind power installations known in the prior art, in particular their angle adjustment devices for adjusting, or positioning, the rotor blades, are not yet realized in an optimal manner.

Thus, in the case of the wind power installation mentioned at the outset (DE 102 26 713 A1), from which the invention proceeds, the respective setting/alignment with respect to the adjustment angle of the respective rotor blade, and/or the time progression of the adjustment of the respective rotor blade, is not yet quite optimal. Thus, when passing the "tower", the revolving rotor blades of the wind power installation come into the back-surge thereof ("tower back-surge"), such that the consistent revolution of the rotor blades can be negatively affected as a result. As a rotor blade is passing the tower back-surge during revolution, the pitch angle of a rotor blade can also change by, for example, 0.5° to 5.0°, in particular owing to the changed wind conditions in the tower back-surge, and is then brought back again within a very short timespan of, for example, approximately 75 ms. Wind gusts, downslope winds and/or wind shear, in particular also caused by geographical conditions (specific coastal and/or hill regions, etc.), also have a corresponding effect upon the setting and/or alignment of the individual rotor blades. In the case of these highly dynamic processes, oscillations can then be induced into the wind power installation, in particular into the respective rotor blade, or caused by the respective rotor blade. This means that, in the case of an adjustment, or in particular in the case of a plurality of adjustments succeeding in very short succession, of the pitch angle, the rotor blades, or the bearings of the stump shafts of the rotor blades are also always excited (by the associated natural frequencies) to further oscillations, which results in an increased noise generation and in an associated increased noise load for the environment.

The other wind power installations known from the prior art (for example, DD 221 505 A1 and DE 20 2009 012 104 U1) are also not realized in an optimal manner. The angle adjustment devices, embodied here as a rod mechanism, for realizing the adjustment of the rotor blades are subject to very high tolerances, owing to the force transfer chains realized via rods, joints and dampers. This also results, on the one hand, in an increased susceptibility to faults, or in an increased resource requirement for assembly and maintenance, and on the other hand, in particular owing to the large number of structural components, also in an increased requirement for structural space, which, however, in the case of rotor hubs having an angle adjustment device integrated therein, is available only to a limited extent.

SUMMARY OF THE INVENTION

The invention is therefore based on the object of designing and developing the wind power installation mentioned at the outset in such a manner that the noise caused by the wind power installation can be reduced, and the resource requirement for assembly and maintenance, and the associated costs, are minimized.

The previously indicated object is now firstly achieved in that the disk cams are coupled in constraint in a functionally operative manner via at least one coupling element. Since, in particular, the angle adjustment device is now realized such that the disk cams are coupled in constraint in a functionally operative manner via at least one coupling element, it can be ensured that all rotor blades are positioned and/or aligned synchronously, in particular synchronously with respect to the amount of the respective adjustment angle $\varphi$ and the respective adjustment speed $\dot{\varphi}$ of the respective rotor blade. The synchronous adjustment/alignment of the rotor blades also avoids, or prevents, potentially occurring oscillations, as in the case of a single-blade control.

Moreover, the now correspondingly realized angle adjustment device requires only a small structural space, and can thus be accommodated in the rotor hub in a manner that is simple and saving of structural space, or can be integrated for this purpose. Furthermore, the resource requirement for assembly and maintenance for such an angle adjustment device, and the associated costs, are correspondingly reduced.

The disadvantages stated at the outset are therefore avoided, and corresponding advantages are achieved.

There are now a multiplicity of possibilities for designing and developing the wind power installation according to the invention in an advantageous manner. For this, reference may first be made to the claims that are subordinate to the independent claim. A plurality of preferred exemplary embodiments of the invention are now to be explained in greater detail in the following, on the basis of the drawing that follows and the associated description.

BRIEF DESCRIPTION OF THE SEVERAL VIEWS OF THE DRAWING

FIG. 1a, FIG. 1b and FIG. 2 show essential constituent parts of a wind power installation that is not represented in its entirety, or in detail, here.

DESCRIPTION OF THE INVENTION

Figure 1A:
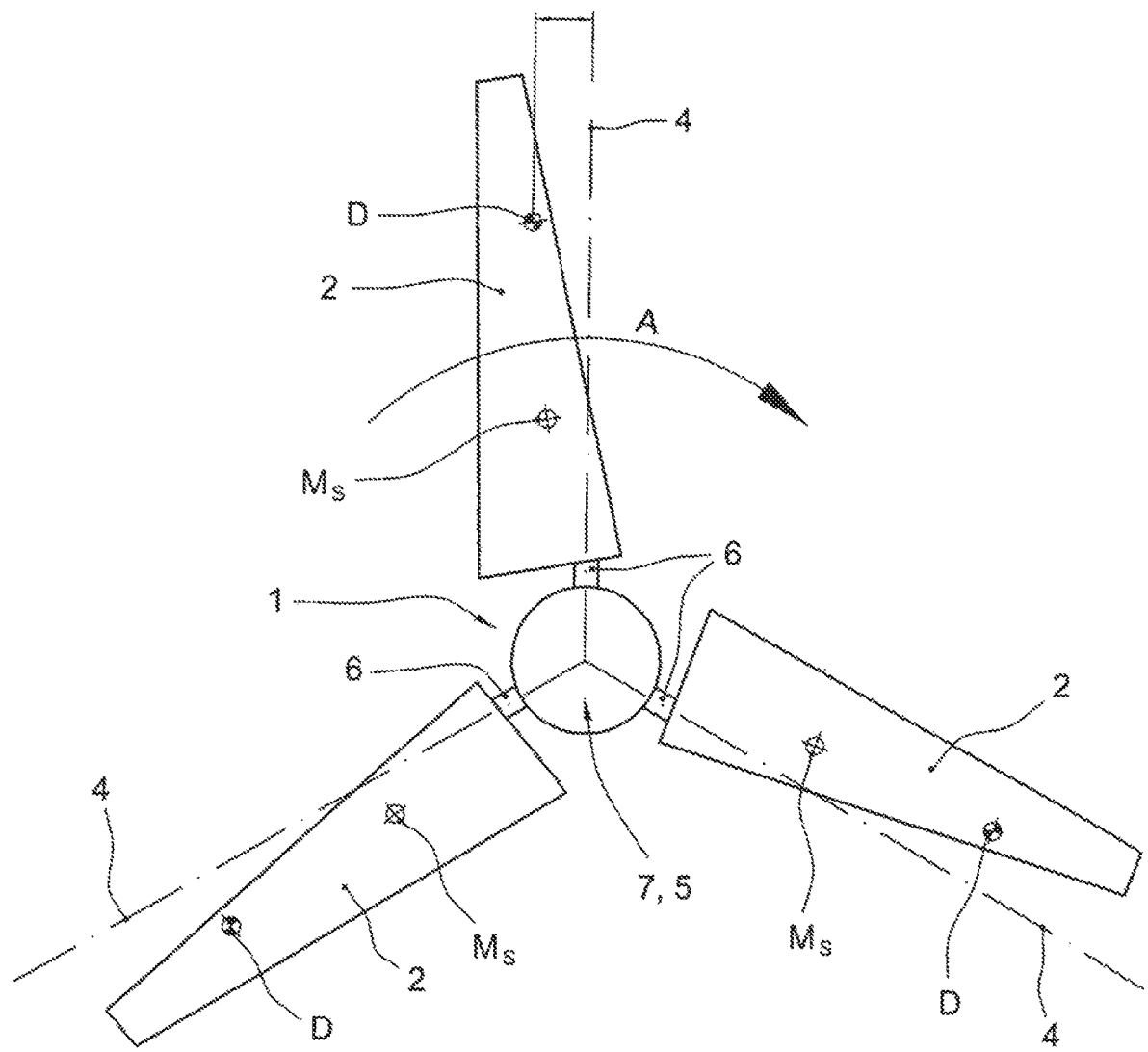
FIG. 1a the rotor of the wind power installation according to the invention, from the front in a schematic representation, FIG. 1b in a schematic representation, the interior of a rotor hub, namely, the essential constituent parts of the angle adjustment device, as viewed into the "opened rotor hub", but without representation of the coupling elements, FIG. 2 the rotor of the wind power installation according to the invention, in a schematic representation from the side, FIG. 3a, 3b, 3c a simplified respective schematic representation of a preferred embodiment of the wind power installation according to the invention, from behind as viewed into the "opened rotor hub" (FIG. 3a), from the side in section (FIG. 3b), and in partially sectional plan view (FIG. 3c), the interior of the rotor hub, with the essential constituent parts, being represented in the "neutral position" of the rotor blades, FIG. 4a, 4b, 4c a simplified respective schematic representation of the preferred embodiment of the wind power installation according to the invention represented in FIGS. 3a to 3c, from behind as viewed into the "opened rotor hub" (FIG. 4a), from the side in section (FIG. 4b), and in partially sectional plan view (FIG. 4c), the interior of the rotor hub, with the essential constituent parts, being represented with "pitched" rotor blades, FIG. 5a, 5b, 5c a simplified respective schematic representation of the preferred embodiment of the wind power installation according to the invention represented in FIGS. 3a to 3c, or FIGS. 4a to 4c, from behind as viewed into the "opened rotor hub" (FIG. 5a), from the side in section (FIG. 5b), and in partially sectional plan view (FIG. 5c), the interior of the rotor hub, with the essential constituent parts, being represented in the "end position" of the rotor blades, FIG. 6a, 6b, 6c a simplified respective schematic representation of a further preferred embodiment of the wind power installation according to the invention, from behind as viewed into the "opened rotor hub" (FIG. 6a), from the side in section (FIG. 6b), and in partially sectional plan view (FIG. 6c), the interior of the rotor hub, with the essential constituent parts, being represented in the "neutral position" of the rotor blades, FIG. 7a, 7b, 7c a simplified respective schematic representation of the preferred further embodiment represented in FIGS. 6a to 6c, from behind as viewed into the "opened rotor hub" (FIG. 7a), from the side in section (FIG. 7b), and in partially sectional plan view (FIG. 7c), the interior of the rotor hub, with the essential constituent parts, being represented with "pitched" rotor blades, FIG. 8a, 8b, 8c a schematic representation of the embodiment represented in FIGS. 6a to 7c, or FIGS. 4a to 7c, from behind as viewed into the "opened rotor hub" (FIG. 8a), from the side in section (FIG. 8b), and in partially sectional plan view (FIG. 8c), the interior of the rotor hub, with the essential constituent parts, being represented in the "end position" of the rotor blades, FIG. 9a, 9b, 9c a simplified respective schematic representation of a further preferred embodiment of the wind power installation according to the invention, from behind as viewed into the "opened rotor hub" (FIG. 9a), from the side in section (FIG. 9b), and in partially sectional plan view (FIG. 9c), the interior of the rotor hub, with the essential constituent parts, being represented in the "neutral position" of the rotor blades, FIG. 10a, 10b, 10c a simplified respective schematic representation of the preferred further embodiment represented in FIGS. 9a to 9c, from behind as viewed into the "opened rotor hub" (FIG. 10a), from the side in section (FIG. 10b), and in partially sectional plan view (FIG. 10c), the interior of the rotor hub, with the essential constituent parts, being represented with "pitched" rotor blades, FIG. 11a, 11b, 11c a simplified respective schematic representation of the preferred further embodiment represented in FIGS. 9a to 9c, or FIGS. 10a to 10c, from behind as viewed into the "opened rotor hub" (FIG. 11a), from the side in section (FIG. 11b), and in partially sectional plan view (FIG. 11c), the interior of the rotor hub, with the essential constituent parts, being represented in the "end position" of the rotor blades, FIG. 12a, 12b, 12c a simplified respective schematic representation of a further preferred embodiment of a wind power installation according to the invention, from behind as viewed into the "opened rotor hub" (FIG. 12a), from the side in section (FIG. 12b), and in partially sectional plan view (FIG. 12c), the interior of the rotor hub, with the essential constituent parts, being represented in the "neutral position" of the rotor blades, FIG. 13a, 13b, 13c a simplified respective schematic representation of the preferred further embodiment represented in FIGS. 12a to 12c, from behind as viewed into the "opened rotor hub" (FIG. 13a), from the side in section (FIG. 13b), and in partially sectional plan view (FIG. 13c), the interior of the rotor hub, with the essential constituent parts, being represented with "pitched" rotor blades, FIG. 14a, 14b, 14c a simplified respective schematic representation of the embodiment represented in FIGS. 12a to 12c, or FIGS. 13a to 13c, from behind as viewed into the "opened rotor hub" (FIG. 14a), from the side in section (FIG. 14b), and in partially sectional plan view (FIG. 14c), the interior of the rotor hub, with the essential constituent parts, being represented in the "end position" of the rotor blades, FIG. 15a, 15b, 15c a simplified respective schematic representation of a further preferred embodiment of a wind power installation according to the invention, from behind as viewed into the "opened rotor hub" (FIG. 15a), from the side in section (FIG. 15b), and in partially sectional plan view (FIG. 15c), the interior of the rotor hub, with the essential constituent parts, being represented in the "neutral position" of the rotor blades, FIG. 16a, 16b, 16c a simplified respective schematic representation of the embodiment represented in FIGS. 15a to 15c, from behind as viewed into the "opened rotor hub"

The wind power installation has at least one rotor 1, having at least two rotor blades 2, preferably having a plurality of rotor blades 2, in this case having three. The rotor blades 2 are operatively connected to a substantially horizontally arranged rotor shaft 3. For this purpose, the rotor blades 2 each have a stump shaft 6, which is rotatably mounted inside a rotor hub 7. Accordingly, the rotor blades 2 are rotatable about a substantially radially aligned adjustment axis 4, at least one angle adjustment device 5 being provided for the purpose of adjusting and/or aligning the rotor blades 2.

Figure 2:
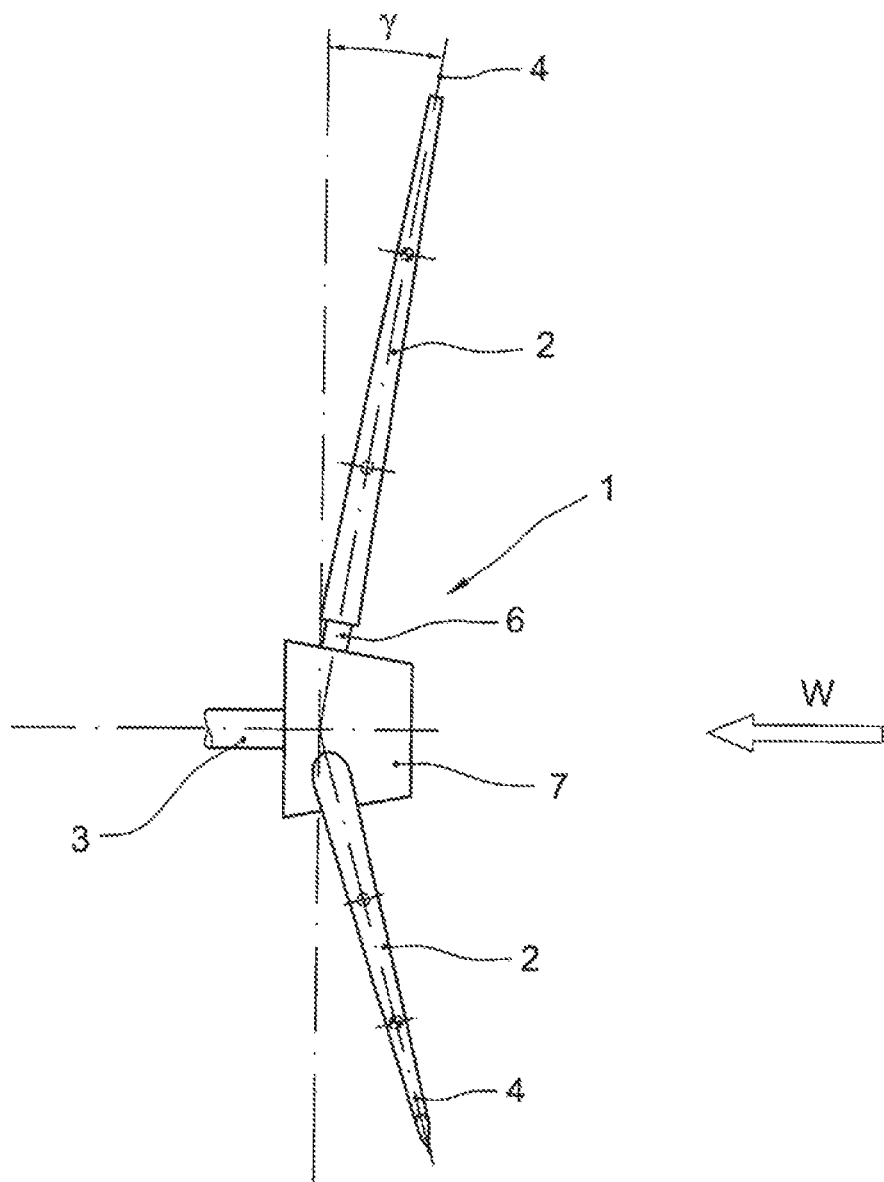

FIG. 2 shows a substantially radially aligned adjustment axis 4 of the rotor blades 2, in this case aligned substantially at a defined angle γ in relation to the vertical. The angle γ lies, in particular, in the range of from 0 to 30 degrees.

In this case, the rotor blades 2, upon receiving incident flow of a wind W, at the corresponding wind speed, cause a rotational motion of the rotor shaft 3, since the rotor blades 2 are operatively connected to the rotor shaft 3, which is to be explained in yet greater detail in the following.

The rotor shaft 3 is arranged, in particular, substantially horizontally. It is also quite conceivable for the rotor shaft 3 to be arranged slightly obliquely, or even vertically. Preferably, however, the rotor shaft 3 is arranged substantially horizontally, and is correspondingly operatively connected to a generator, not represented here, in order to generate corresponding energy, or electricity.

Figure 1B:
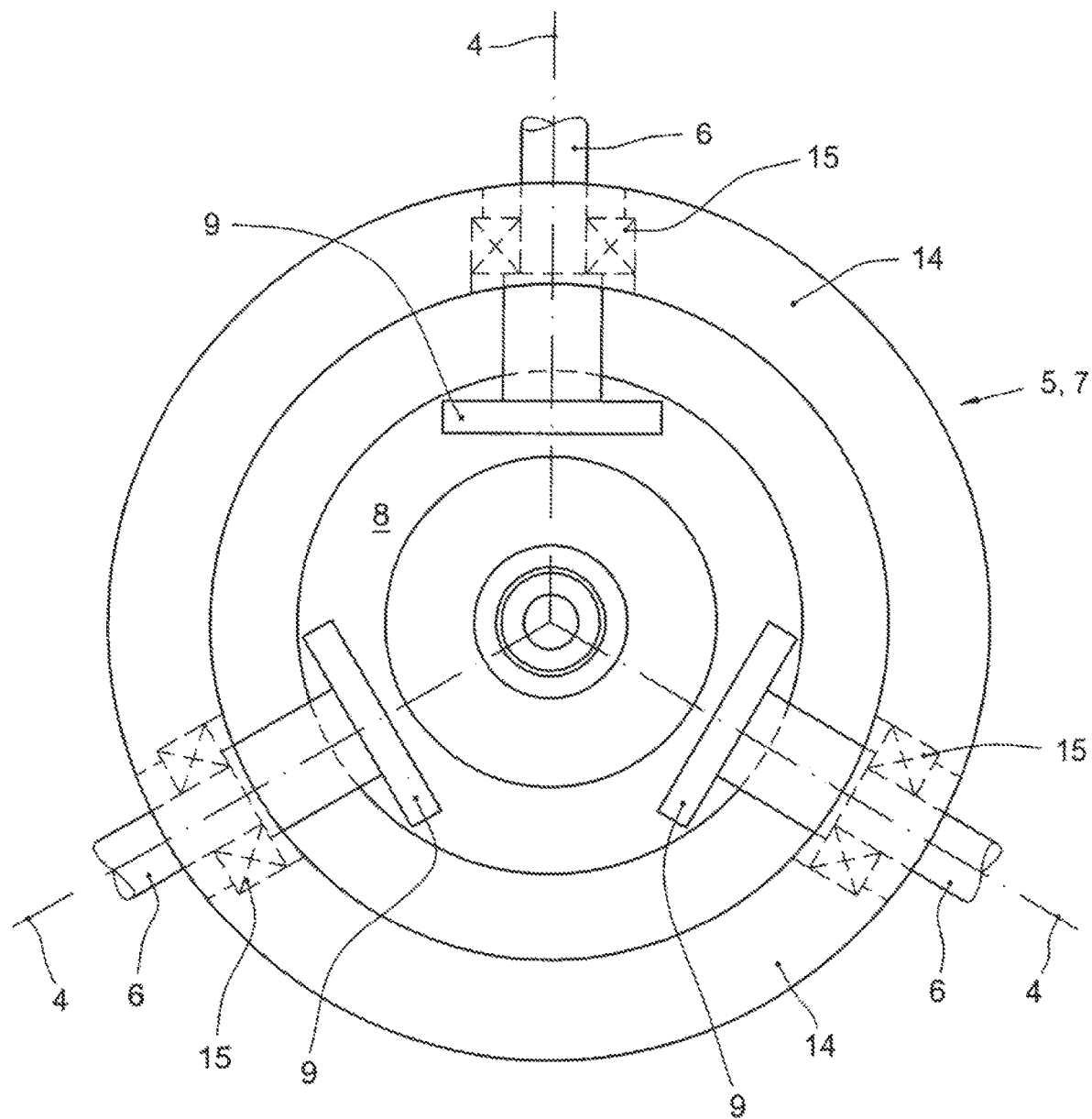

As can be seen from FIG. 1b, the respective adjustment axis 4 is substantially defined by the respective axis of the respective stump shaft 6, or the respective adjustment axis 4 is defined by the axis of the respective bearing 15.

As is likewise clearly shown by FIG. 1a, the individual rotor blades 2, i.e. the longitudinal axes of the rotor blades 2, do not coincide with the respective adjustment axis 4, but are arranged such that the respective working point D of the rotor blades 2 lags the respective adjustment axis 4 in the rotation of the rotor 1. The rotational motion of the rotor 1 is represented by the corresponding arrow A in FIG. 1a.

FIG. 2 then shows the rotor 1 in a schematic representation from the side. Clearly visible are the rotor blades 2 mounted, via the stump shafts 6, in the rotor hub 7, and the rotor shaft 3, which here is indicated schematically and shown in a partial representation. It can be seen from the representation in FIG. 2 that the adjustment axes 4 run substantially radially with respect to the rotor shaft 3, but preferably the adjustment axes 4 of the rotor blades 2 are inclined substantially slightly forward, such that the rotor blades 2 form an acute angle, in particular an angle γ, with the general rotor plane. When the wind power installation is in operation, the arrangement of the rotor blades 2, the realization of an angle γ and the realization of a lagging working point D result in an adjustment moment, in particular in the direction of the feathering position (position/alignment in the direction of the wind).

Figure 20B:
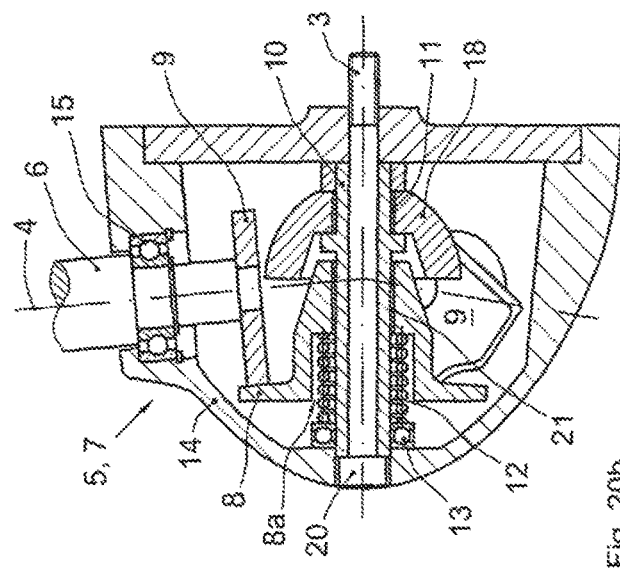
Figure 20A:
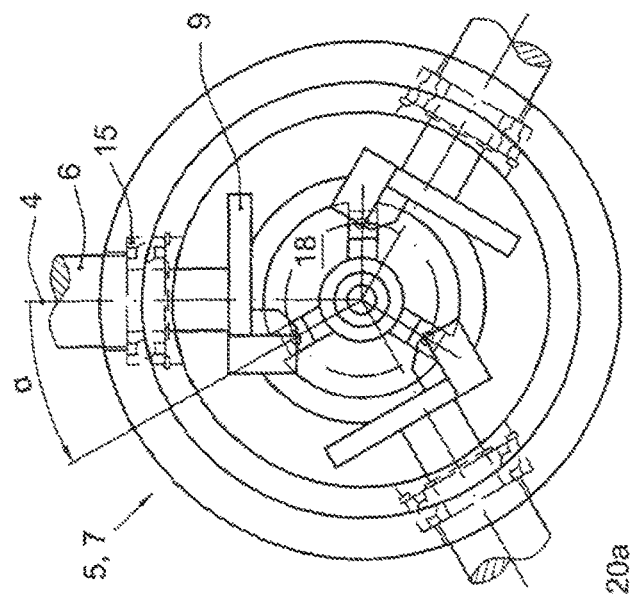
Figure 20C:
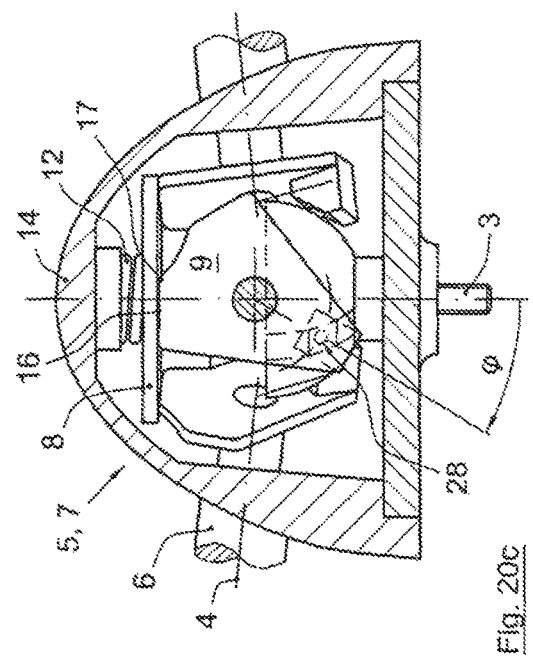

FIG. 3 (a,b,c) to FIG. 20 (a,b,c) show schematic representations of preferred embodiments of the wind power installation, in each case from behind, from the side in section, and partially in plan view, the interior of the rotor hub, with the essential constituent parts, being represented, in particular, as viewed into the "opened rotor hub", for differing positions of the rotor blades 2.

The angle adjustment device 5 represented in FIG. 3 (a,b,c) to FIG. 20 (a,b,c) has at least two disk cams 9, in this case in particular three disk cams 9, which act in combination with a control disk 8. The disk cams 9 are rotatably arranged in such a manner that the respective rotation axis of the disk cam 9 coincides with the adjustment axis 4 of the respective rotor blade 2, in particular is superimposed.

The disadvantages described at the outset are now firstly avoided in that the disk cams 9 are coupled in constraint in a functionally operative manner via at least one coupling element 18. Since at least one coupling element 18 is now provided, and the disk cams 9 are coupled in constraint in a functionally operative manner by means of the coupling element 18, the disadvantages stated at the outset are avoided, and corresponding advantages are realized.

In particular, there is no need to provide elaborate, additional rod elements, dampers or the like that are susceptible to wear, such that, in particular, with the thus realized wind power installation, or the thus realized angle adjustment device 5, it is also possible to realize a short force transfer chain, with a transfer of force that, in particular, has little play, and therefore to realize small tolerances and an exact blade pitch angle φ of the rotor blades 2, which is now to be explained in yet greater detail in the following.

In addition, in this case the open-loop or closed-loop control elements of the wind power installation, or of the angle adjustment device 5, are very well protected against the effects of weather, such as rain or the occurrence of ice accretion, as well as corrosion, since the angle adjustment device 5, or the respective components, can be substantially completely integrated within the rotor hub 7, which is likewise to be described in greater detail in the following.

Created as a result, therefore, is an angle adjustment device 5 that is inexpensive, has a low rate of wear and—ultimately—has almost no tolerances, by means of which the rotor blades 2 can be optimally positioned and the excitation, or generation, of oscillations is avoided as far as possible.

As can be seen in FIG. 3 (a,b,c) to FIG. 20 (a,b,c), the preferred embodiments of the wind power installation, or of the angle adjustment device 5 represented here, have a control disk 8, three disk cams 9 and a coupling element 18, the disk cams 9 being coupled in constraint in a functionally operative manner. Further, it can also be seen that the control disk 9, and the coupling element 18, are arranged on a control shaft 10 within the rotor hub 7, the control shaft 10 being realized as a constituent part (sub-shaft) of the rotor shaft 3, or being operatively connected to the rotor shaft 3. In each case, the control disk 8, and also the coupling element 18, are rotatably mounted on the control shaft 10 by means of bearings 11 and 21, in particular the bearing 21 being embodied as a sliding bushing, and the bearing 11 being embodied as a plain bearing or rolling bearing. The control disk 8 is additionally mounted in an axially displaceable manner on the control shaft 10. Moreover, the control shaft 10 is embodied as a hollow shaft, such that the rotor hub 7 can be connected to the rotor shaft 3, by means of a separably non-positively engaging connection, preferably by means of a screw element 20, for the purpose of transmitting the torque of the rotor 1. The angle adjustment device 5 is constructed in such a space-saving manner that it can be integrated within the rotor hub 7. This facilitates the assembling of the entire wind power installation, since only one screw element 20 is required for assembly, which is additionally of great advantage. The angle adjustment device 5 and the rotor hub 7 therefore form an easily assembled module.

Further, it can be seen from FIG. 3 (a,b,c) to FIG. 20 (a,b,c) that the individual disk cams 9 are in frictional contact with the control disk 8. In this case, force is applied to the control disk 8 by a spring element 12, in the direction of the disk cams 9. The spring element 12 is rotatably supported, by means of a bearing 13, with respect to the—inner—circumferential wall 14 of the rotor hub 7, thus rendering possible a rotation of the control disk 8, and also a corresponding rotation of the spring element 12. Also, the realization of the spring element 12, embodied here, in particular, as a helical compression spring, has proved to be a preferred embodiment. It is also conceivable, however, for other spring elements, for example disk springs or the like, to be provided here.

The rotation axis of the control disk 8 and of the coupling element 18 correspond with the rotation axis of the control shaft 10, or of the rotor shaft 3. The disk cams 9 are in each case located at the lower ends of the stump shafts 6 of the rotor blades 2, and are arranged here in a rotationally fixed manner. The disk cams 9 are coupled to each other in constraint by the coupling disk 18.

In addition, the axes of the individual stump shafts 6, thus in particular the adjustment axes 4 of the respective rotor blades 2, are defined. The respective stump shaft 6 is rotatably mounted within the circumferential wall 14 of the rotor hub 7. A corresponding bearing 15 is provided for this purpose in each case. Depending on the number of rotor blades 2, a corresponding number of stump shafts 6, or of disk cams 9, is then also provided. It is thus quite conceivable for the angle adjustment device 5 therefore to have—as here—not only three, but in particular two, four or even more rotor blades 2, or disk cams 9, which act in combination with the corresponding control disk 8, and with the disk cams 9 then being coupled to each other in constraint by at least one coupling element 18. This is dependent on the respective embodiment of the wind power installation, in particular of the rotor 1 and/or on the number of rotor blades 2.

It is also advantageous that the control disk 8 and also the spring element 12 are rotatably mounted, which is to be explained in yet greater detail in the following. As a result of this, wear phenomena, in particular an abrasion between the control disk 8 and the disk cams 9, are also considerably minimized, since, owing to the capability of the control disk 8 to rotate together with the helical compression spring 12, there is only a small amount of frictional wear, and there is a high quality of closed-loop control of the angle adjustment device 5. The explanations above also show that the angle adjustment device 5 realized here is embodied as a so-called "passive" angle adjustment device 5.

In particular, it is advantageous in this case that the entire angle adjustment device 5 is arranged substantially within the rotor hub 7, and therefore the individual elements are protected here against effects of weather. As a result of this, the necessary contacts that occur are not diminished, or the combined action of the elements is not impaired, by the ingress of water or other weather effects, such as ice accretions or dirt.

The disk cams 9 represented schematically in FIG. 3 (a,b,c) to FIG. 20 (a,b,c) have a corresponding contour 16 in the upper region. The course of the respective contour 16 of the respective disk cam 9 comprises two extrema 17. These extrema 17 serve to realize the "zero position", or the neutral position, of the respective disk cam 9 on the control disk 8. In other words, the zero position/neutral position of the respective disk cam 9 relative to the control disk 8 is unambiguously defined by means of the extrema 17. An optimal setting of the neutral position of the rotor blades 2 is thereby ensured.

FIG. 3 (a,b,c) to 20 (a,b,c) now show differing embodiments for the constrained coupling of the disk cams 9 by means of a coupling element 18. In this case, the respective embodiments are represented with differing positionings/alignments of the rotor blades 2, or of the disk cams 9, namely, in the respective neutral position, in a respective defined positioning/alignment/rotation, and in the respective end position, as can be seen from FIG. 3 (a,b,c) to 20 (a,b,c). Represented in some of the figures, on the one hand, is the adjustment angle φ of the rotor blades 2, and the rotation angle α coupling element 18.

Figure 3B:
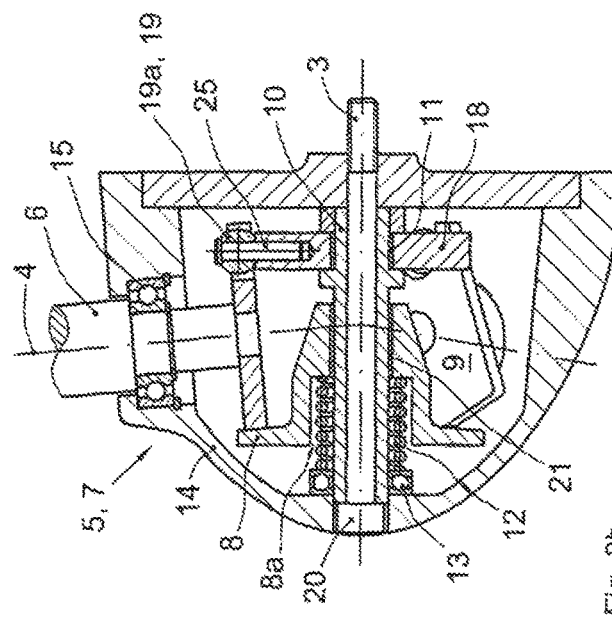
Figure 3A:
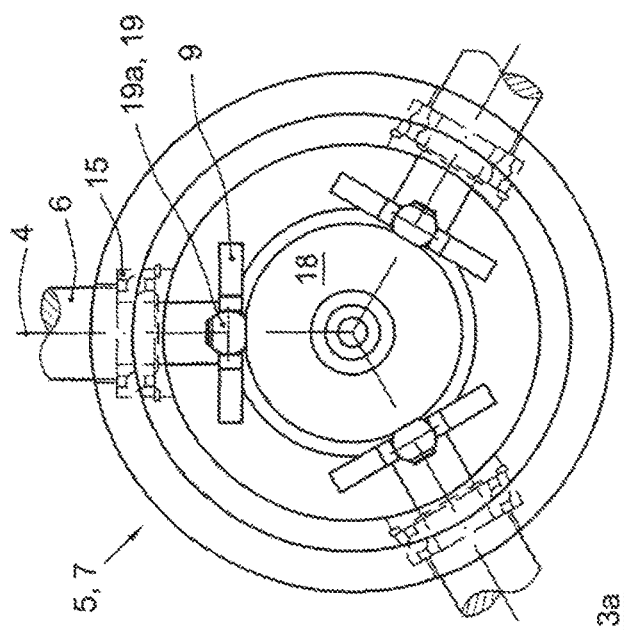
Figure 3C:
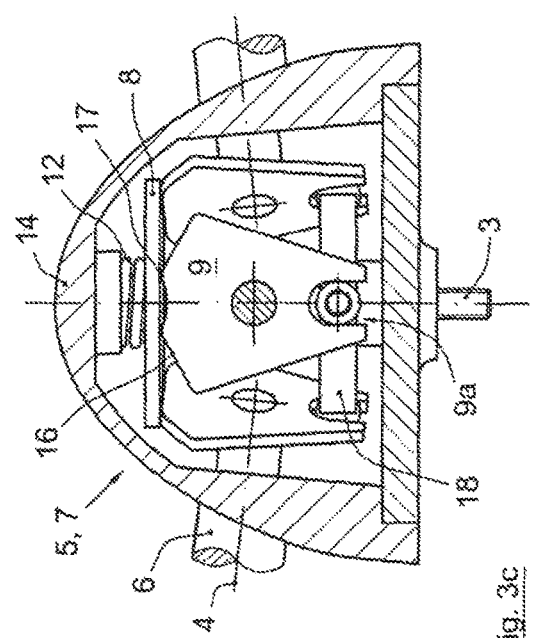

In a preferred embodiment, as represented in FIGS. 3a to 3c (or as can also be seen from FIGS. 4 to 17), it is evident that the coupling element 18 is embodied, at least partly, in the form of a disk.

In addition, according to the embodiment of FIGS. 3 to 5, for the purpose of constrained coupling the coupling element 18 has a driver stud 19 for each disk cam 9. The driver stud 19 is movably, in particular rotatably, mounted on a bearing bolt 25 provided on the coupling element 18. The respective driver stud 19 engages in a recess 9a of the disk cam 9, and is thus operatively connected to the disk cam 9 by positive engagement. Preferably, for this purpose the driver stud 19 is embodied as a symmetrical spherical disk 19a.

Figure 4B:
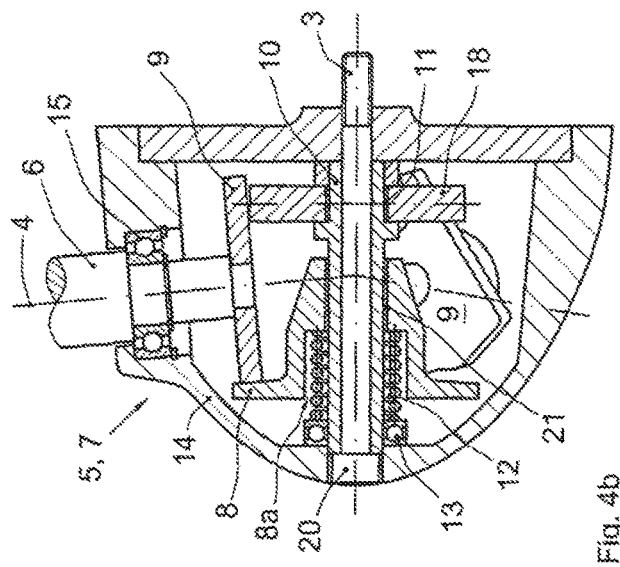
Figure 4A:
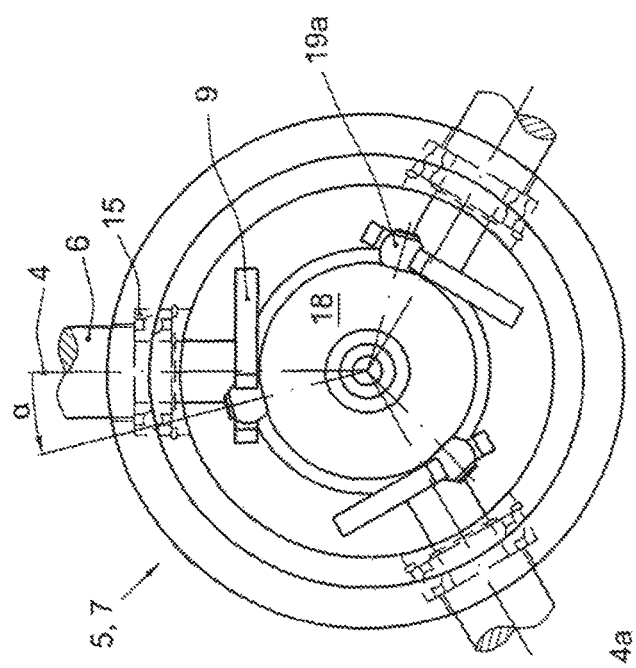
Figure 4C:
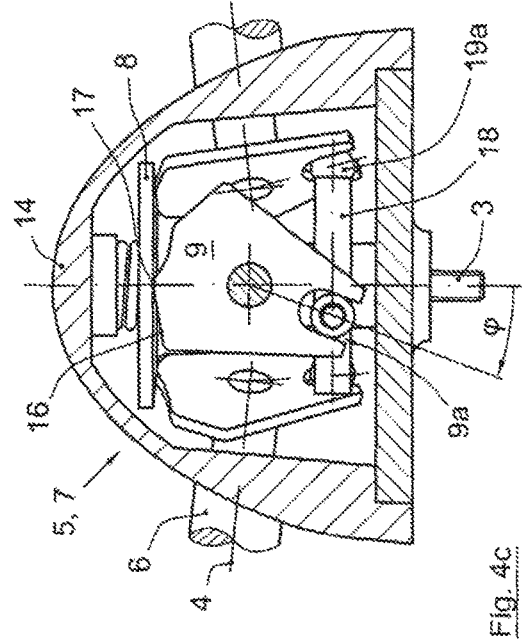
Figure 5B:
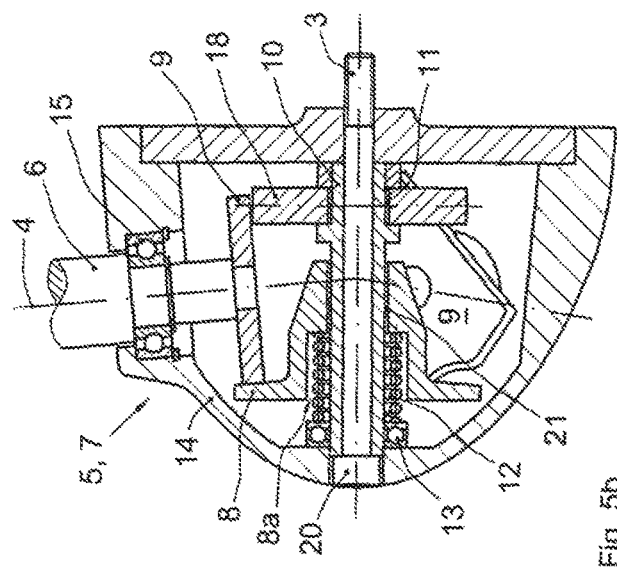
Figure 5A:
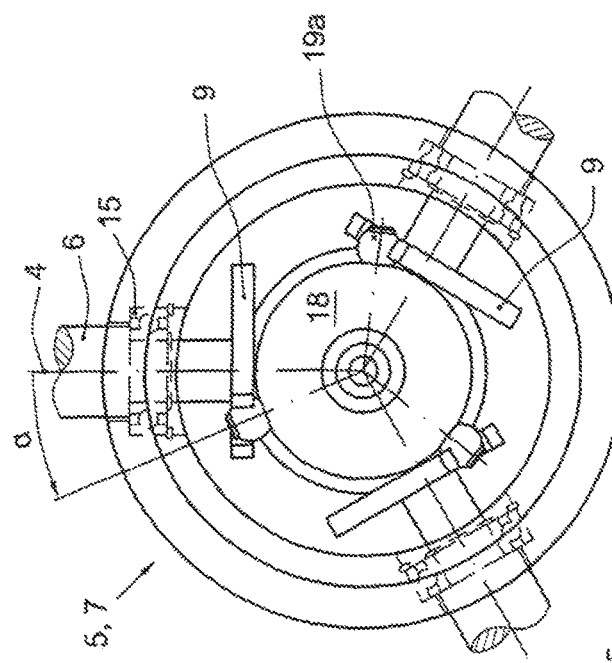
Figure 5C:
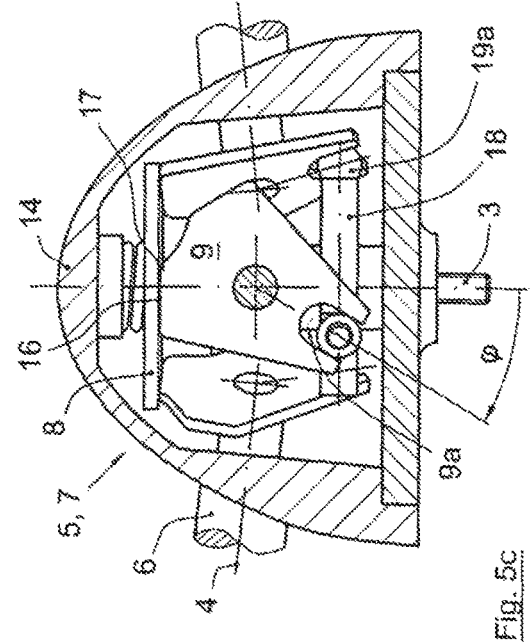
Figure 7B:
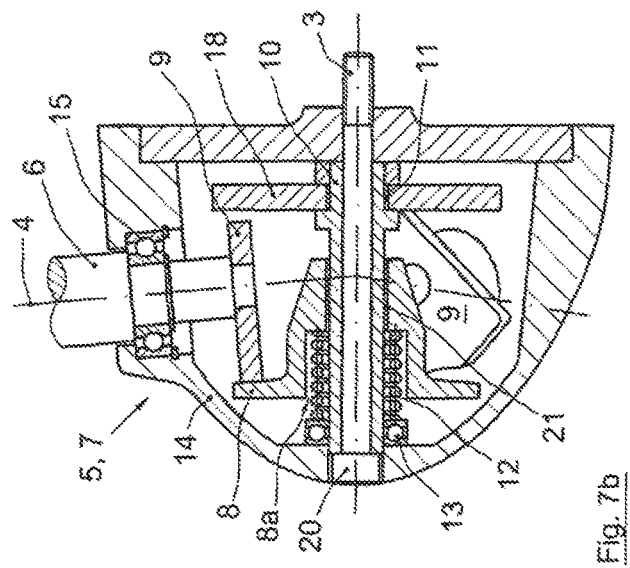
Figure 7A:
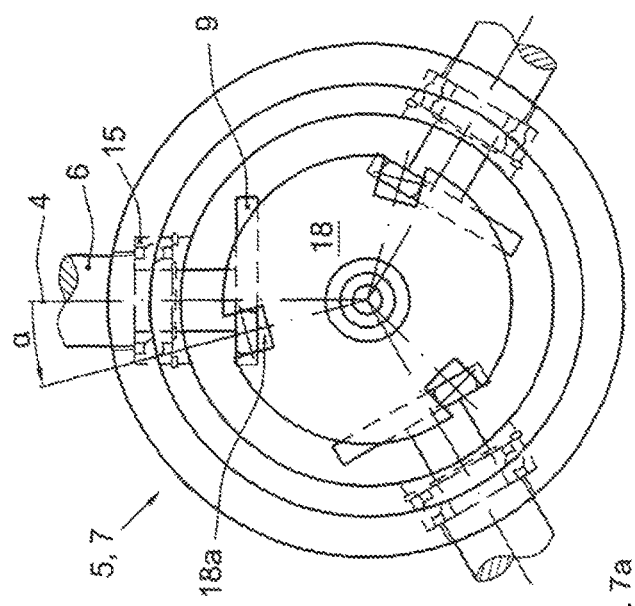
Figure 7C:
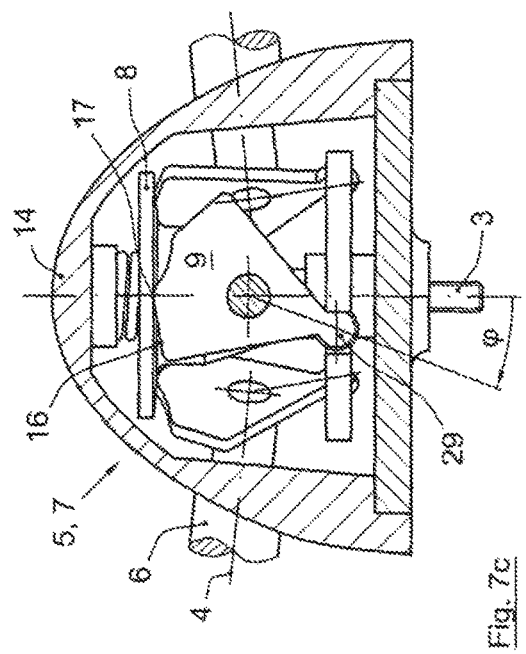
Figure 8B:
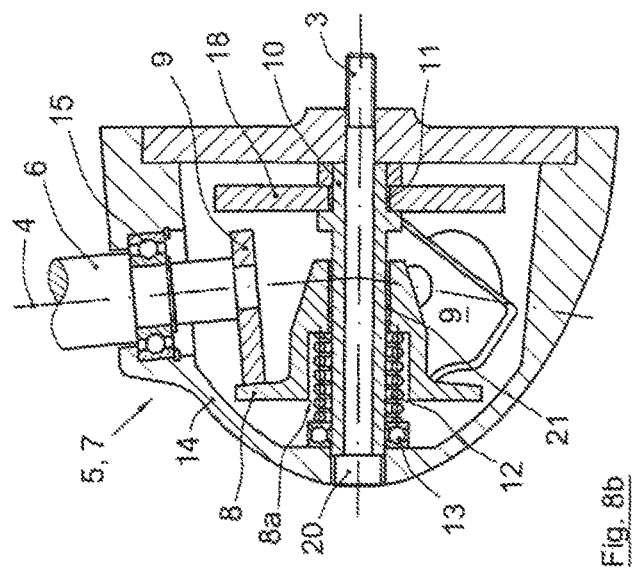
Figure 8A:
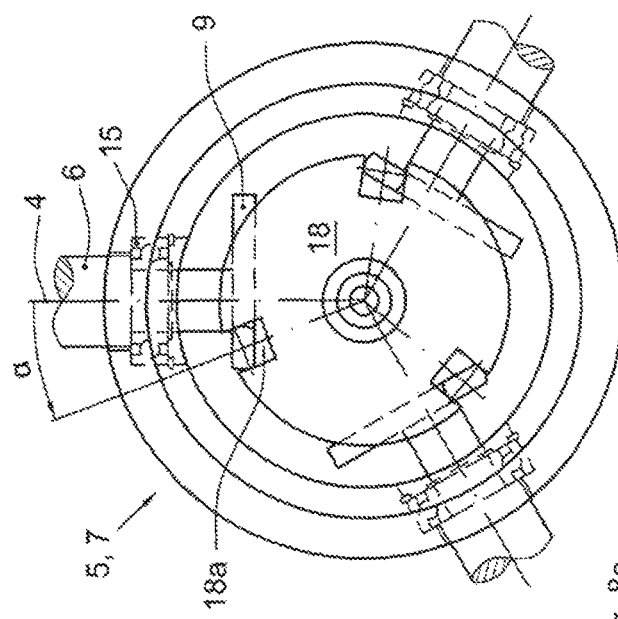
Figure 8C:
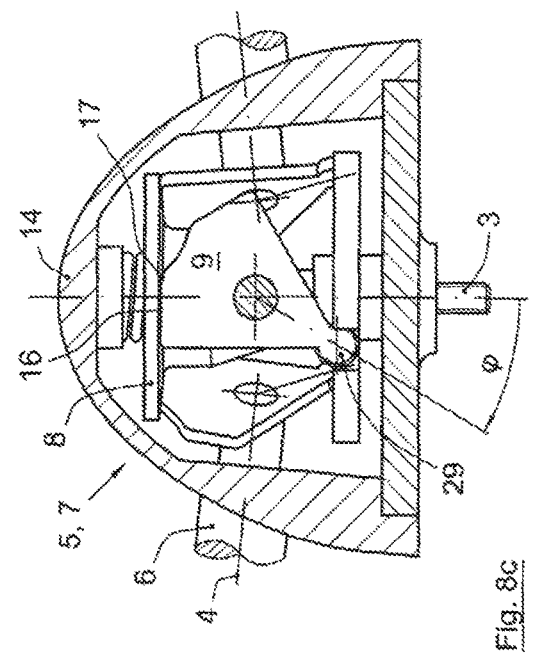
Figure 9B:
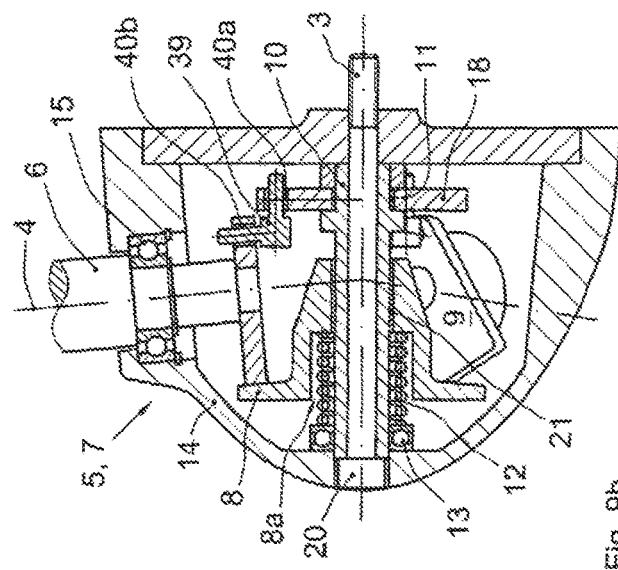
Figure 9A:
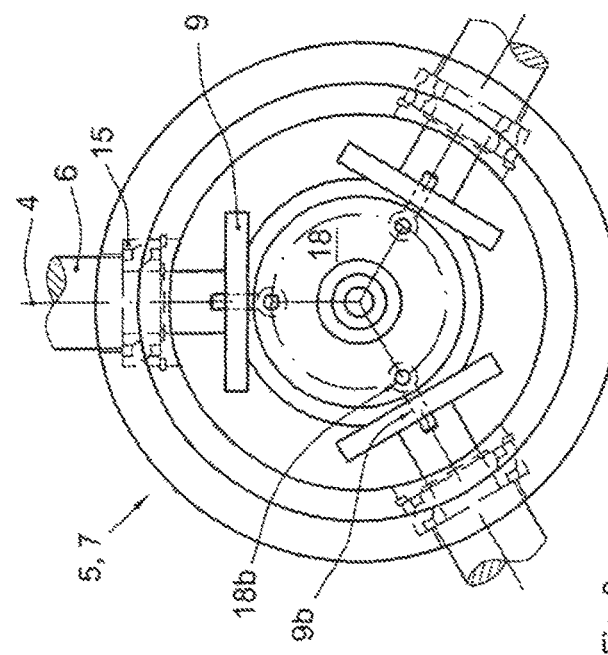
Figure 9C:
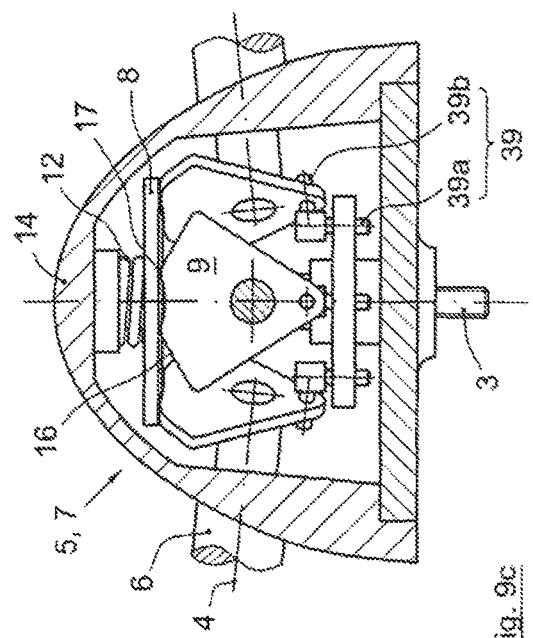
Figure 10B:
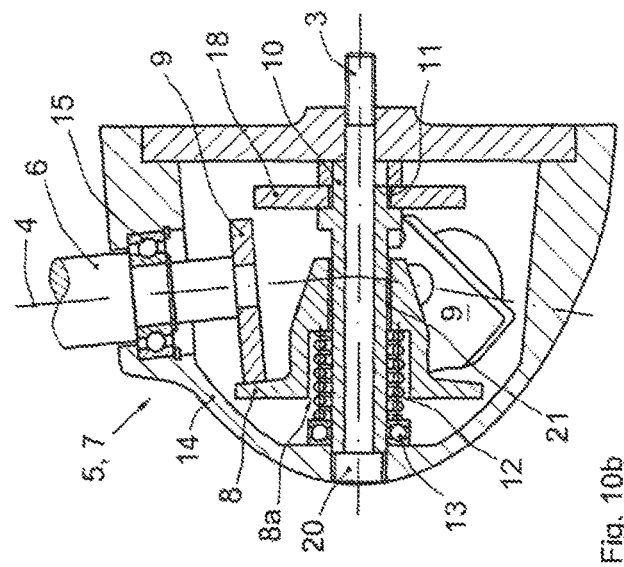
Figure 10A:
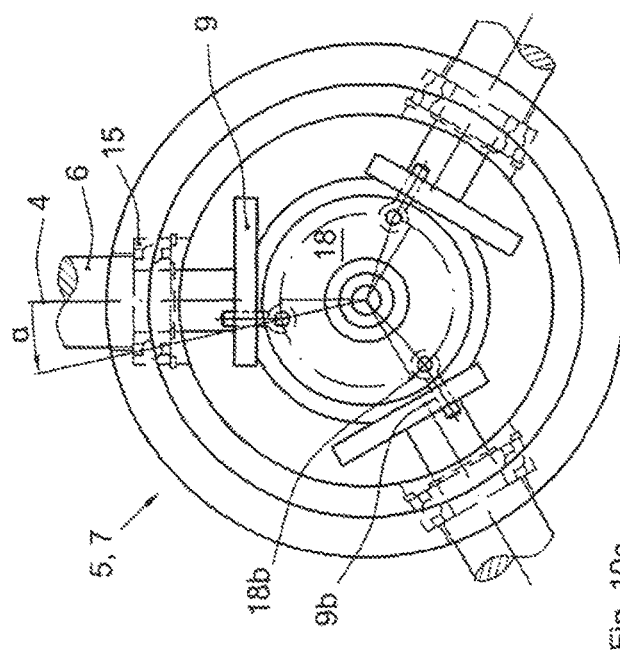
Figure 10C:
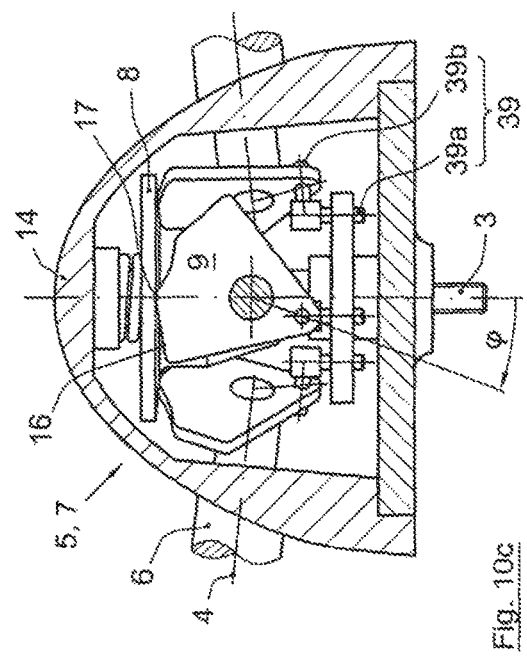
Figure 11B:
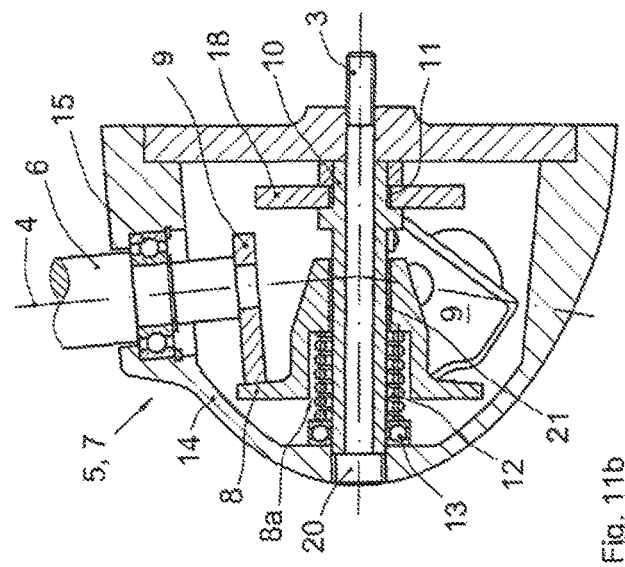
Figure 11A:
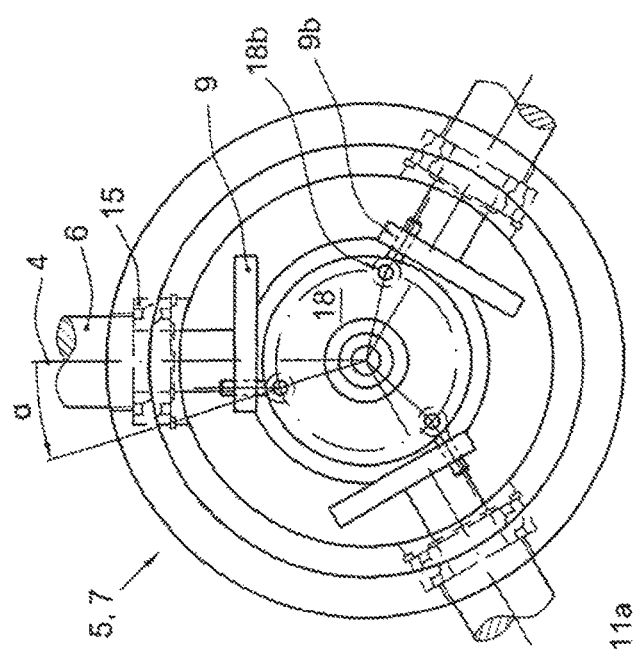
Figure 11C:
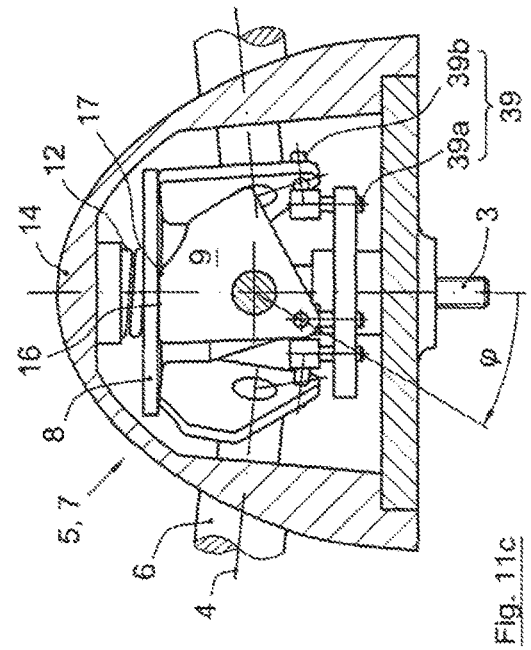
Figure 12A:
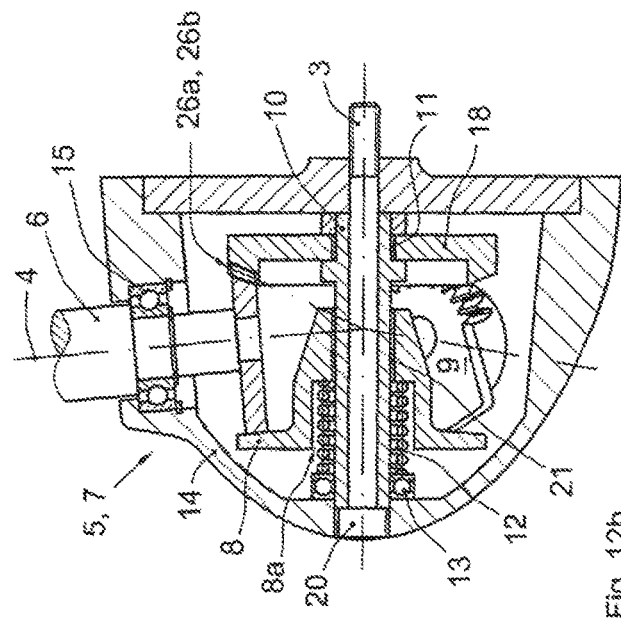
Figure 12B:
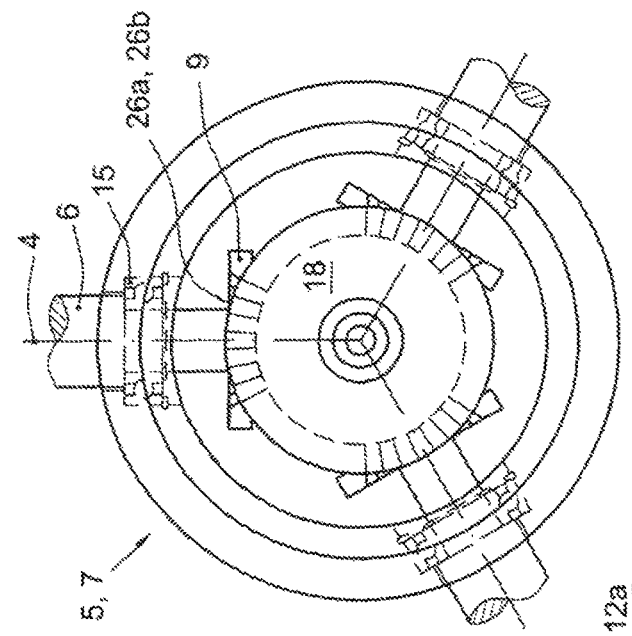
Figure 12C:
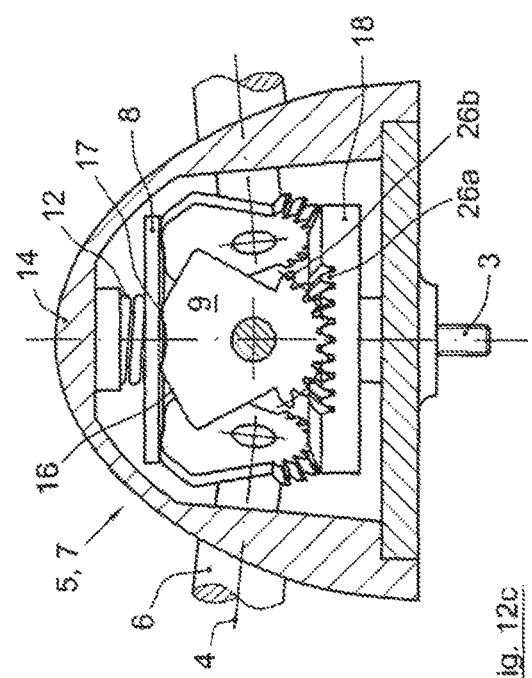
Figure 13B:
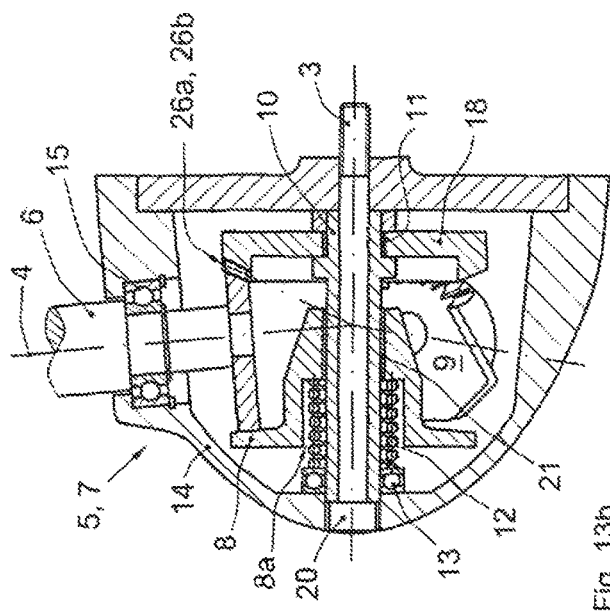
Figure 13A:
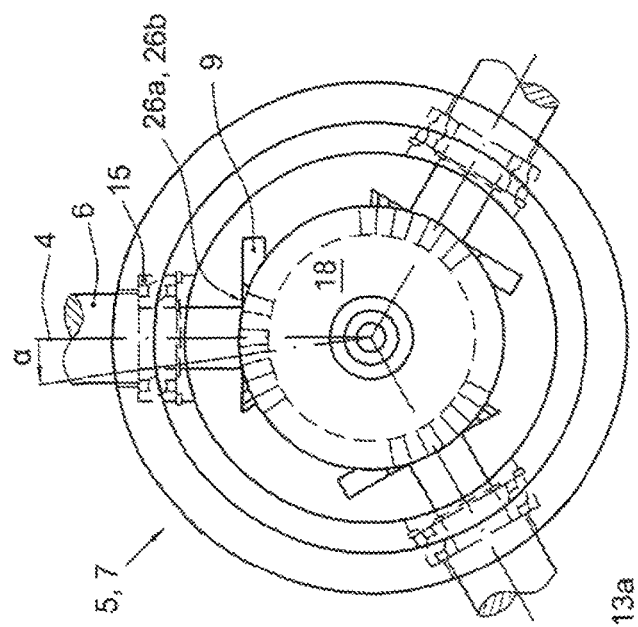
Figure 13C:
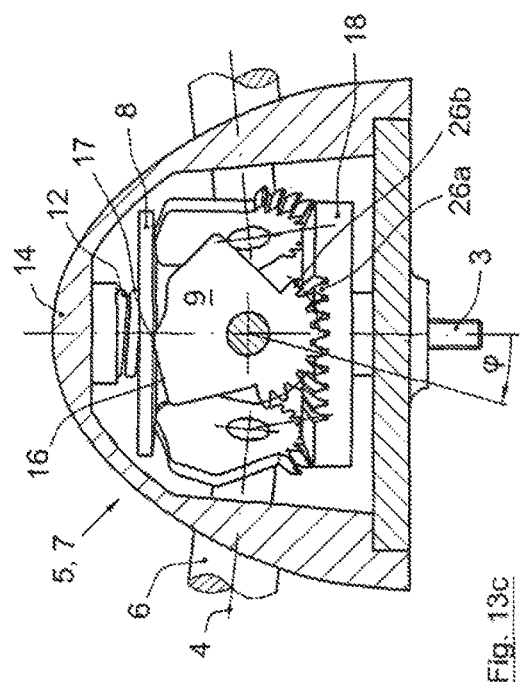
Figure 14B:
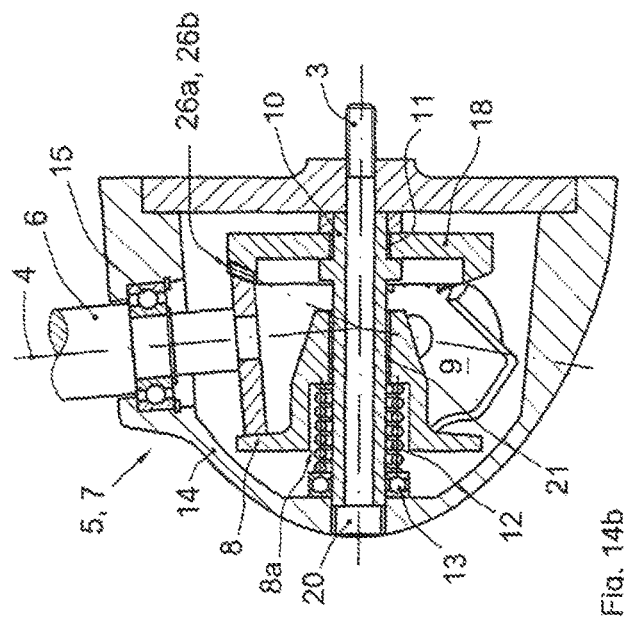
Figure 14A:
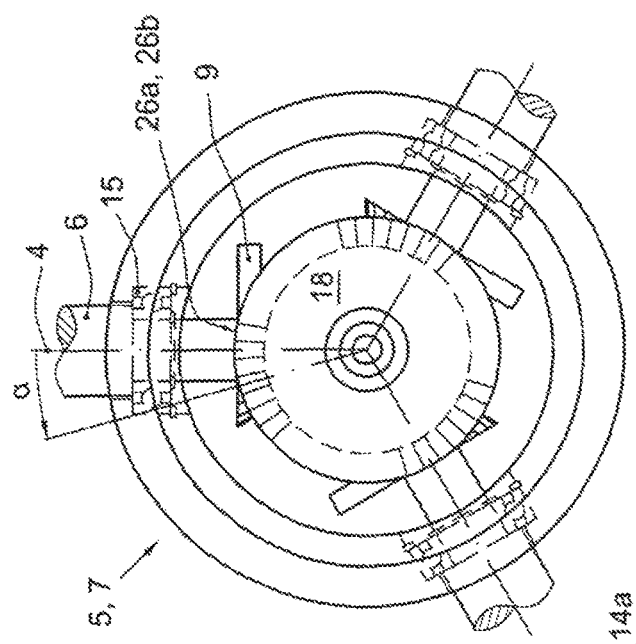
Figure 14C:
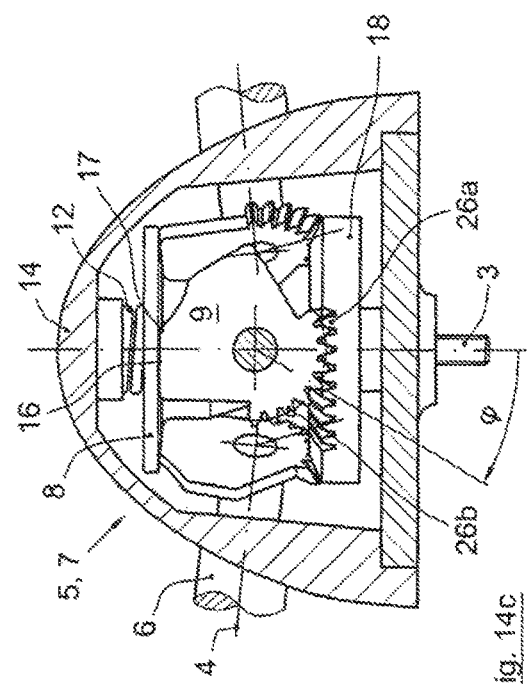
Figure 15B:
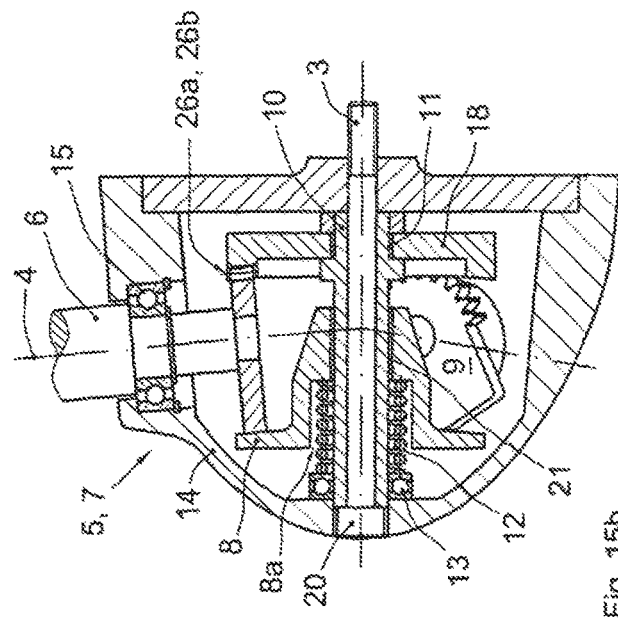
Figure 15A:
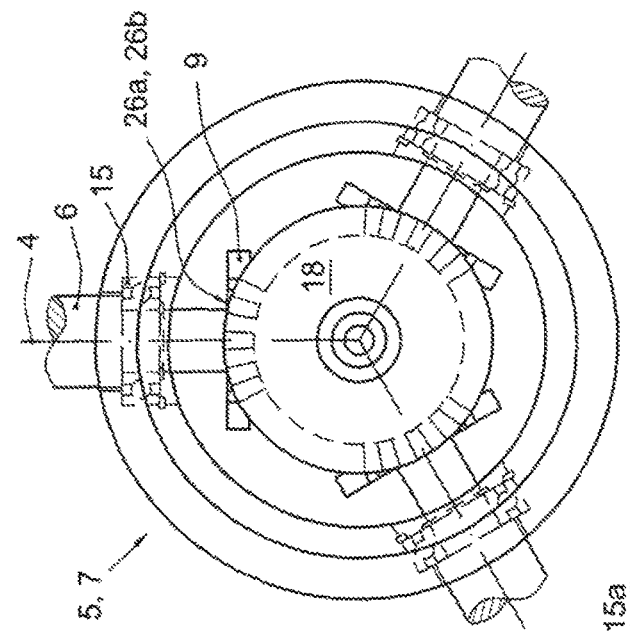
Figure 15C:
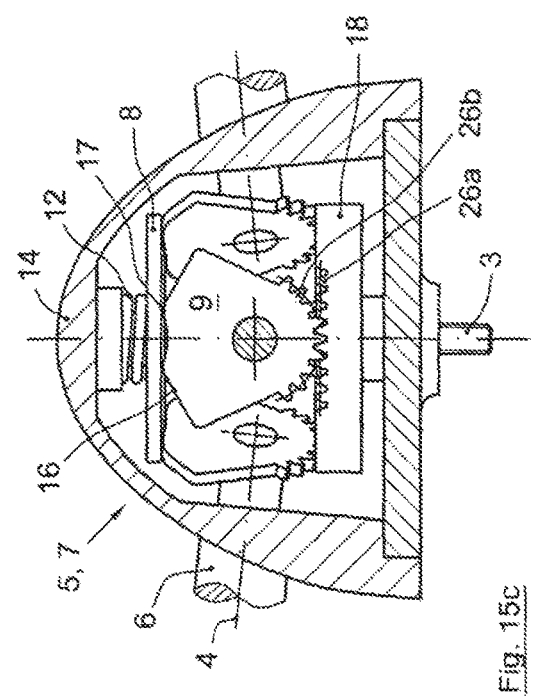
Figure 16B:
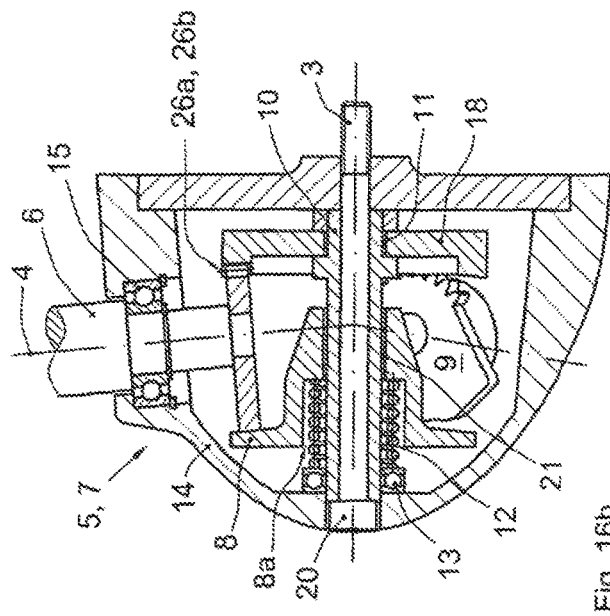
(FIG. 16a), from the side in section (FIG. 16b), and in partially sectional plan view (FIG. 16c), the interior of the rotor hub, with the essential constituent parts, being represented with "pitched" rotor blades, FIG. 17a, 17b, 17c a simplified respective schematic representation of the embodiment represented in FIGS. 15a to 15c, or FIGS. 16a to 16c, from behind as viewed into the "opened rotor hub" (FIG. 17a), from the side in section (FIG. 17b), and in partially sectional plan view (FIG. 17c), the interior of the rotor hub, with the essential constituent parts, being represented in the "end position" of the rotor blades, FIG. 18a, 18b, 18c a simplified respective schematic representation of a further preferred embodiment of a wind power installation according to the invention, from behind as viewed into the "opened rotor hub" (FIG. 18a), from the side in section (FIG. 18b), and in partially sectional plan view (FIG. 18c), the interior of the rotor hub, with the essential constituent parts, being represented in the "neutral position" of the rotor blades, FIG. 19a, 19b, 19c a simplified respective schematic representation of the embodiment represented in FIGS. 18a to 18c, from behind as viewed into the "opened rotor hub" (FIG. 19a), from the side in section (FIG. 19b), and in partially sectional plan view (FIG. 19c), the interior of the rotor hub, with the essential constituent parts, being represented with "pitched" rotor blades, FIG. 20a, 20b, 20c a simplified respective schematic representation of the embodiment represented in FIGS. 18a to 18c, or FIGS. 19a to 19c, from behind as viewed into the "opened rotor hub" (FIG. 20a), from the side in section (FIG. 20b), and in partially sectional plan view (FIG. 20c), the interior of the rotor hub, with the essential constituent parts, being represented in the "end position" of the rotor blades.
Figure 16A:
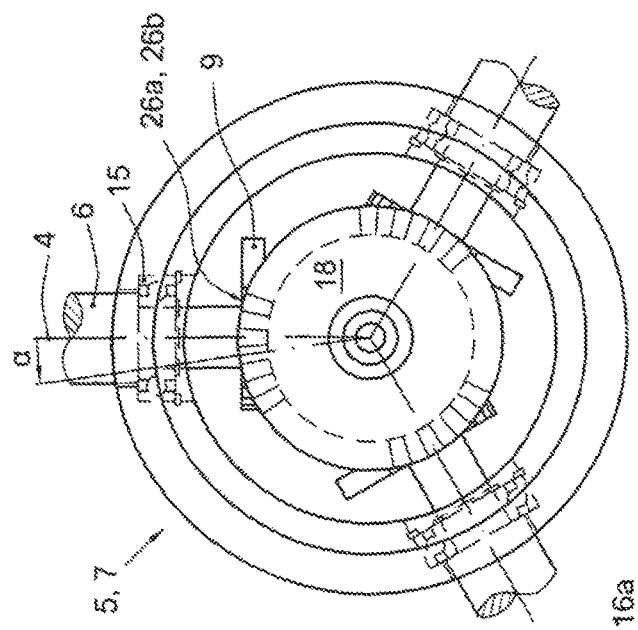
Figure 16C:
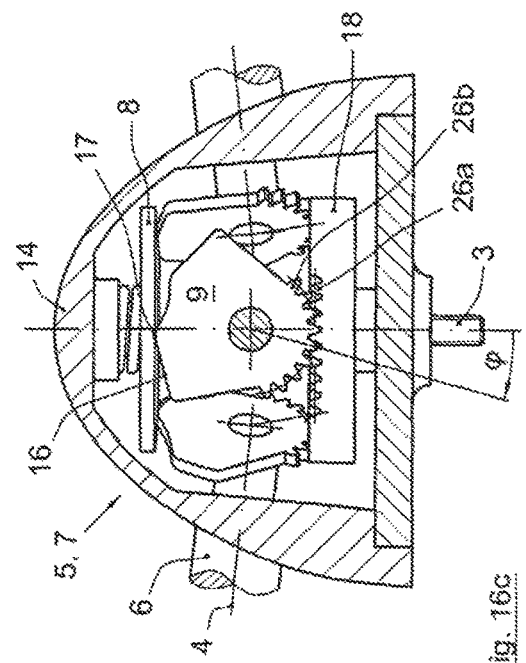
Figure 17B:
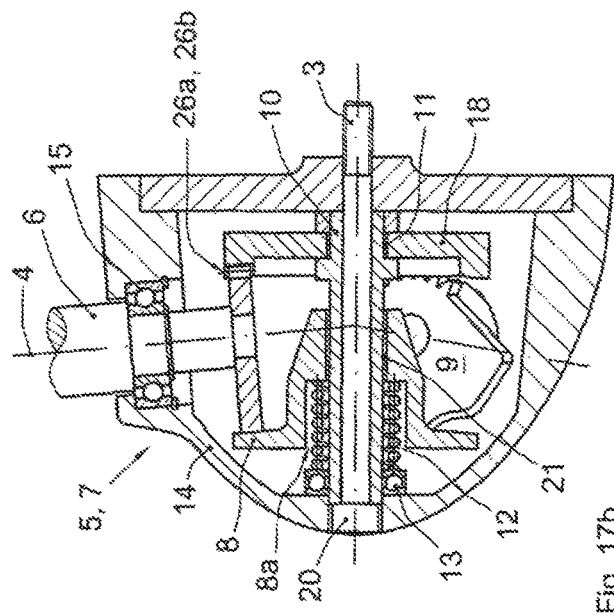
Figure 17A:
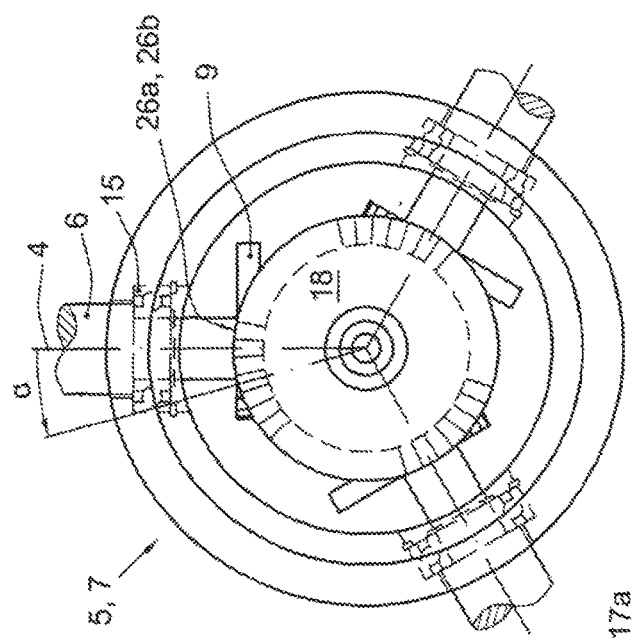
Figure 17C:
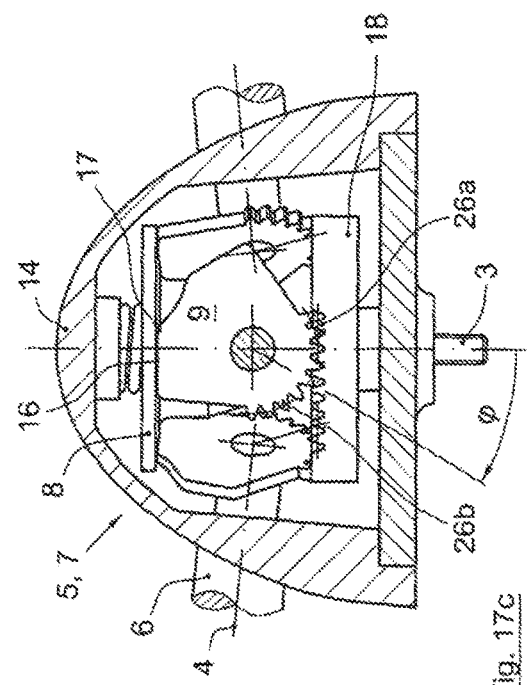

Represented from the FIGS. 4a to 4c, and 5a to 5c is the angle adjustment device as represented in FIGS. 3a to 3c, but with FIG. 4a, 4b, 4c representing an angular position/defined alignment of the rotor blades 2, and an end position (stop position) of the disk cam 9 being represented in FIG. 5a, 5b. 5c. It becomes clear that a rotation of a disk cam 9 about the adjustment axis 4 results in a rotation of the coupling element 18 about the axis of the rotor shaft 3, and in a synchronous rotation of the other disk cams 9, even if the rotations do not occur in congruent planes.

It likewise becomes evident that the driver stud 19 is not only rotatable in the recess 9a of the disk cam 9, but is also translationally movable in the recess 9a of the disk cam 9. A rolling friction is therefore realized between the respective disk cam 9 and the respective driver stud 19.

All of these elements, or these components, i.e. the disk cams 9, the control disk 8, the spring element 12 and the coupling element 18 are now realized and arranged in such a manner that the holding moment, or the holding forces, can correspondingly be transmitted to the rotor blades 2, such that their position can correspondingly be controlled by open-loop or closed-loop control. In connection with this, reference may again be made to FIG. 1a. It is clearly evident here that the working point D of the rotor blades 2 lags the respective adjustment axis 4. As a result of this, in the case of an incident flow with a high wind speed, there is a rotation cp of the rotor blades about the adjustment axis 4, in particular because the working point D is just outside the respective adjustment axis 4.

As can be seen from FIG. 6a, 6b, 6c and FIG. 8a, 8b, 8c, a further preferred embodiment of the angle adjustment device 5 represented here has a control disk 8, three disk cams 9 and a coupling element 18, the disk cams 9 being coupled in constraint in a functionally operative manner via the coupling element 18. For this purpose, the coupling element 18, embodied in the form of a disk, has recesses 18a, and the disk cams 9 each have a driver extension 29, each driver extension 29 of the respective disk cam 9 engaging in an associated recess 18a of the coupling element 18. Preferably, for this purpose the driver extension 29 is embodied as a symmetrical spherical disk. The driver extension 29 is not only rotatably mounted in the associated recess 18a of the coupling element 18, but is also translationally movable in the recess 18a of the coupling element 18. A sliding friction is realized between the driver extension 29 and the coupling element 18.

FIG. 6b additionally shows that the control disk 8, and the coupling element 18, are arranged on a control shaft 10 within the rotor hub 7. Here, the disk cam 9 and the driver extension 29 are embodied as a unitary structural element. It is likewise conceivable, however, for the driver extension 29 to be fixed to the disk cam 9 by a separable positive-engagement connection.

As can be seen from FIG. 9a, 9b, 9c to FIG. 11a, 11b, 11c, a further embodiment of the wind power installation, or of the angle adjustment device 5, represented here has a control disk 8 and three disk cams 9 and a coupling element 18, which are coupled in constraint in a functionally operative manner. For this purpose, the coupling element 18, embodied in the form of a disk, and the disk cams 9, have openings, preferably through-holes, a first limb 39a of an angular connection element 39 engaging in an opening 18b of the coupling element 18, and a second limb 39b of the angular connection element 39 engaging in an opening of the disk cam 9. The respective connection element 39 is positioned in such a manner that it lies between the coupling element 18 and the respective disk cam 9, or is arranged operatively between them. Preferably, both the opening 9b of the disk cam 9 and the opening 18b of the coupling element 18 form a close sliding fit with the respectively associated first limb 39a and the second limb 39b of the connection element 39, respectively. In addition, the first limb 39a and the second limb 39b of the connection element 39 are rotatably mounted in the respective opening 9b and 18b, respectively, by means of a bearing 40a, 40b.

As can be seen from FIG. 12a, 12b, 12c to FIG. 17a, 17b, 17c, a further preferred embodiment of the angle adjustment device 5 represented here has a control disk 8, three disk cams 9 and a coupling element 18, the disk cams 9 being coupled in constraint in a functionally operative manner via the coupling element 18. For this purpose, the coupling element 18, embodied in the form of a disk, and the disk cams 9 have a mutually fitting toothing 26a/26b, at least portionally. The toothing 26a/26b may be embodied as a bevel gear toothing, as represented in FIG. 12a, 12b, 12c to FIG. 14a, 14b, 14c, or as a spur gear/crown gear toothing, as represented in FIG. 15a, 15b, 15c to FIG. 17a, 17b, 17c.

There are respective toothings 28a made into the coupling element 18, and here in each case there is an appropriate toothing 26 made into the respective disk cam 9 and embodied, accordingly as a structural element. It is likewise conceivable, however, for the respective toothing 26a/26b to be fixed, as an individual toothing module, to the coupling element 18 or on the control disk 9 by means of a separable positive-engagement connection. In the event of damage to the respective toothing 26a/26b, in this case only the toothing modules then need to be changed, and not the disk cam 9 and/or the coupling element 18 as a whole.

Figure 18B:
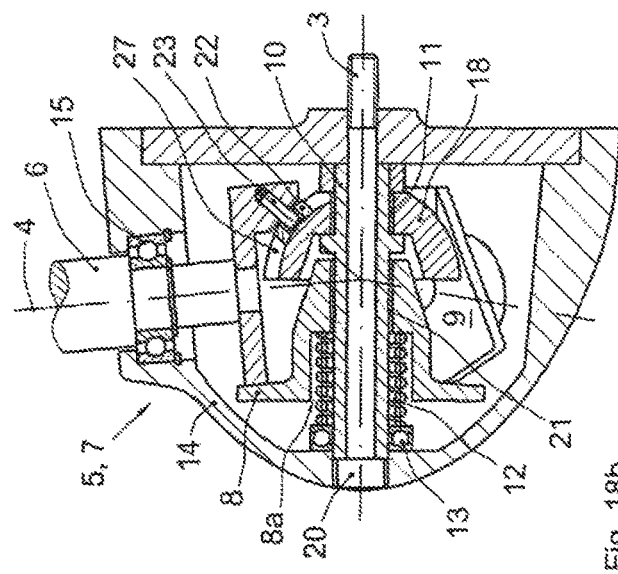
Figure 18A:
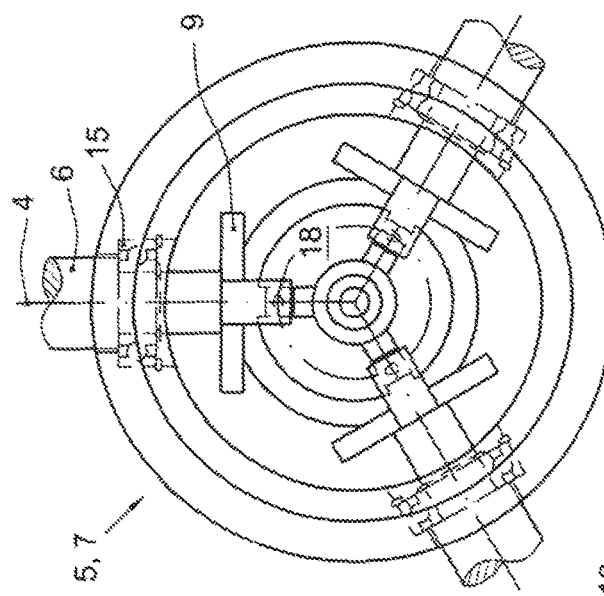
Figure 18C:
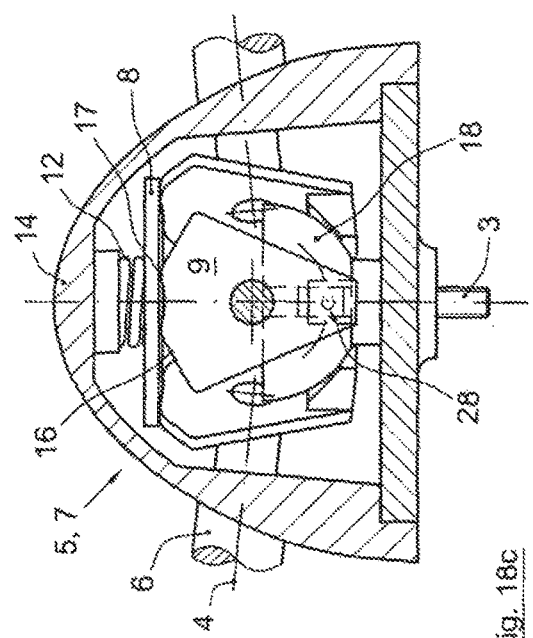
Figure 19B:
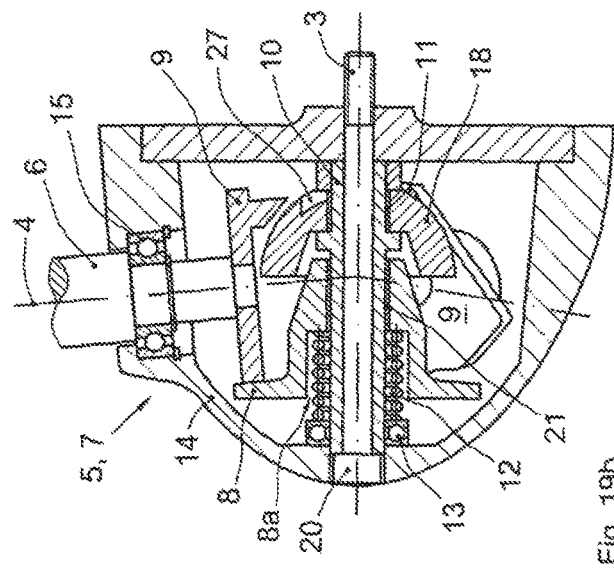
Figure 19A:
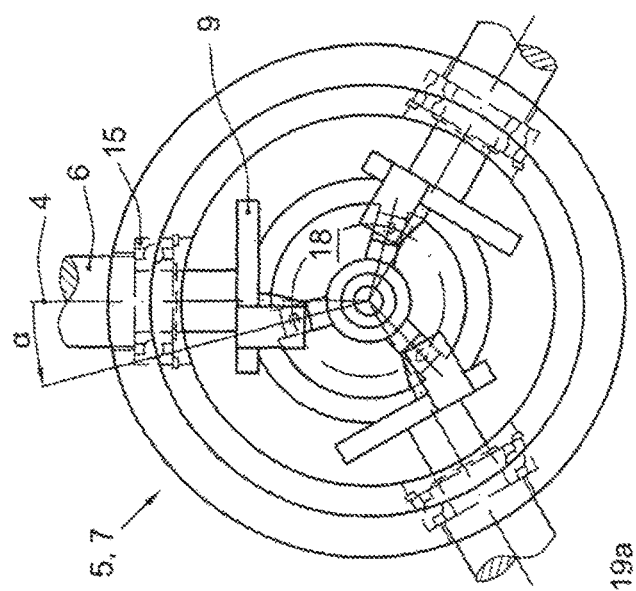
Figure 19C:
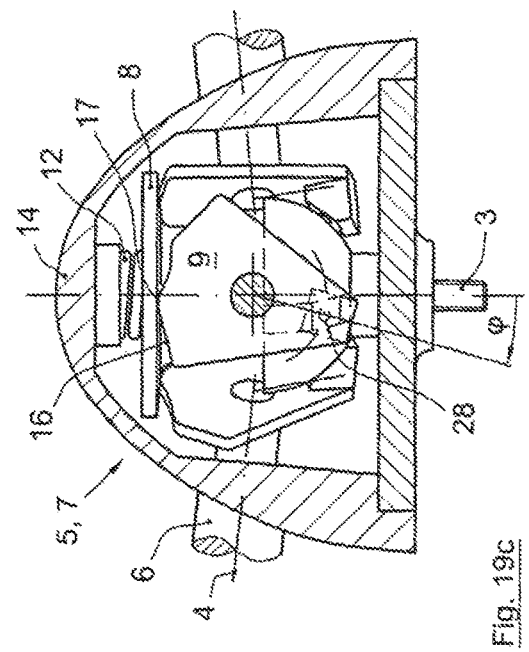

As can be seen from FIG. 18a, 18b, 18c to FIG. 20a, 20b, 20c, a further preferred embodiment of the angle adjustment device 5 represented here has a control disk 8, three disk cams 9 and a coupling element 18, the disk cams 9 being coupled in constraint in a functionally operative manner via the coupling element 18. As represented in FIG. 18b, the coupling element 18 is realized as a hemisphere.

The hemispherical coupling element 18 has, on the outside of the hemisphere, for each disk cam 9, a slideway 27, preferably a slideway 27 realized in the form of a slot or groove. The slideway 27 is suitable for receiving a sliding block 22 that has an operative relationship with the associated disk cam 9, and/or a sliding block 22 is arranged in a sliding manner in the respective slideway 27. The sliding block 22 has a cavity 28, which is embodied, in particular, as a through-opening, the associated disk cam 9 engaging, by means of a pin 23 fixedly attached thereto, in the cavity 28 in the sliding block 22. The cavity 28 of the sliding block 22 preferably forms a close sliding fit with the associated pin 23, the pin 23 being rotatably mounted in the associated sliding block 22.

For this purpose, a suitable bearing 24 may also be provided in the cavity 28 of the sliding block. The pin 23, in turn, is separably fixed by positive engagement in the disk cam 9. The converse is also conceivable, that the pin is connected to the sliding block, and is mounted, or guided, in a rotatable, or displaceable, manner in a cavity of the disk cam.

Finally, it must also be pointed out that the control disk 8, in its middle region, has a substantially axially extending recess 8a, which in particular is realized, at least partly, such that the spring element 12 can be arranged, or is arranged, at least partly, within the recess 8a. This applies substantially to all embodiment represented in FIGS. 3 to 20. As a result of this, a very compact design of a rotor hub 7 is rendered possible.

The angle adjustment device 5 represented here in FIGS. 1 to 20 is embodied and/or realized, in particular, as a so-called "passive" angle adjustment device 5, as already previously explained above. In particular, a force is applied to the control disk 8 by a spring element 12, in the direction of the disk cams 9, such that the individual disk cams 9 are in frictional contact, in particular, with the control disk 8. By means of the respective course of the contour 16 of the respective disk cams 9 in combination with the control disk 8 and/or the spring element 12, which, in particular, then has a defined spring stiffness, during operation the previously mentioned control, or setting, of the rotor blades 2 is then realized automatically by means of the passive angle adjustment device 5 then realized in such a manner. This has the advantage that no separate motor drives are necessary for setting/controlling the rotor blades 2.

LIST OF REFERENCES

1 rotor
2 rotor blade
3 rotor shaft
4 adjustment axis
5 angle adjustment device
6 stump shaft
7 rotor hub
8 control disk
8*a* recess
9 disk cam
9*a* recess
9*b* opening
10 control shaft
11 bearing
12 spring
13 bearing
14 circumferential wall
15 bearing
16 contour
17 extrema
18 coupling element
18*a* recess
18*b* opening
19 driver stud
19*a* spherical disk
20 screw element
21 bearing
22 sliding block
23 pin
24 bearing
25 bearing bolt
26*a*, 26*b* toothing
27 slideway
28 cavity
29 driver extension
39 angular connection element
39*a* first limb of the angular connection element
39*b* second limb of the angular connection element
40*a* bearing
40*b* bearing
W wind
D working point
$M_s$ centroid
A arrow
$\gamma$ cone angle
$\varphi$ adjustment angle of the rotor blades
$\alpha$ a rotation angle of the coupling element

The invention claimed is:

1. A wind power installation, comprising:
at least one rotor having at least two rotor blades, each of said rotor blades is rotatable about a substantially radially aligned adjustment axis;
at least one coupling element; and
at least one angle adjustment device for adjustment of said rotor blades, said angle adjustment device having at least one control disk and at least two disk cams acting in combination with said control disk, each of said disk cams is mounted so as to be rotatable about a rotation axis, and the rotation axis of a respective one of said disk cams coincides with the adjustment axis of an associated one of said rotor blades, said disk cams being coupled in constraint in a functionally operative manner via said at least one coupling element.

2. The wind power installation according to claim 1, wherein said rotor has three said rotor blades, and at least three said disk cams are provided, which act in combination with said control disk.

3. The wind power installation according to claim 1, wherein said coupling element is embodied in a form of a disk.

4. The wind power installation according to claim 1, wherein:
said disk cams each has a recess formed therein; and
said coupling element has a driver stud for each of said disk cams, said driver stud engages in said recess of a respective one of said disk cams.

5. The wind power installation according to claim 4, wherein said driver stud is embodied as a symmetrical spherical disk.

6. The wind power installation according to claim 4, further comprising a bearing bolt disposed on said coupling element, said driver stud is rotatably mounted on said bearing bolt.

7. The wind power installation according to claim 1, wherein:
said coupling element has recesses formed therein; and
said disk cams in each case have a driver extension, said driver extension of a respective one of said disk cams engages in an associated one of said recesses of said coupling element.

8. The wind power installation according to claim 7, wherein said driver extension is embodied as a symmetrical spherical disk.

9. The wind power installation according to claim 7, wherein said driver extension is movably mounted in said associated recess of said coupling element.

10. The wind power installation according to claim 1,
wherein said coupling element has an opening formed therein;
wherein each of said disk cams has an opening formed therein; and
further comprising an angular connection element disposed between said coupling element and a respective one of said disk cams, said angular connection element has two limbs, wherein a first of said limbs of said angular connection element engages in said opening of said coupling element, and a second of said limbs of said angular connection element engages in said opening of said a respective one of said disk cams.

11. The wind power installation according to claim 10, wherein both said opening of said respective disk cam and said opening of said coupling element form a close sliding fit with said first and second limbs, respectively, of said angular connection element.

12. The wind power installation according to claim 10, wherein said first limb and said second limb, respectively, of said angular connection element are rotatably mounted in said opening.

13. The wind power installation according to claim 1, wherein said disk cams and said coupling element have a mutually fitting toothing, at least portionally.

14. The wind power installation according to claim 12, wherein said toothing is embodied as a bevel gear toothing or as spur gear toothing.

15. The wind power installation according to claim 1, wherein said coupling element is realized as a hemisphere.

16. The wind power installation according to claim 15, further comprising a sliding block; and wherein an outside of said hemisphere has a slideway for each of said disk cams, and is suitable for receiving said sliding block that has an operative relationship with an associated one of said disk cams, and/or said sliding block is disposed in a sliding manner in said slideway.

17. The wind power installation according to claim 16, further comprising a fixedly attached pin; and wherein said sliding block has a cavity formed therein, and said associated disk cam engages in said cavity in said sliding block by means of said fixedly attached pin.

18. The wind power installation according to claim 17, wherein said fixedly attached pin is rotatable in said cavity of said sliding block.

19. The wind power installation according to claim 17, wherein said cavity of said sliding block is realized as a close sliding fit with said fixedly attached pin.

20. The wind power installation according to claim 17, wherein said cavity is embodied as a through-opening.

21. The wind power installation according to claim 1, wherein said angle adjustment device is a passive angle adjustment device.

22. The wind power installation according to claim 21, further comprising a spring element and force is applied to said control disk by said spring element, in a direction of said disk cams.

* * * * *